United States Patent
Padawar

(10) Patent No.: US 10,229,455 B2
(45) Date of Patent: Mar. 12, 2019

(54) CREDIT REPAIR BY ANALYSIS OF TRADE LINE PROPERTIES

(71) Applicant: Progrexion IP, Inc., North Salt Lake, UT (US)

(72) Inventor: Justin Randall Padawar, Bountiful, UT (US)

(73) Assignee: PROGREXION IP, INC., North Salt Lake, UT (US)

( * ) Notice: Subject to any disclaimer, the term of this patent is extended or adjusted under 35 U.S.C. 154(b) by 75 days.

(21) Appl. No.: 14/611,013

(22) Filed: Jan. 30, 2015

(65) Prior Publication Data

US 2015/0142639 A1 May 21, 2015

Related U.S. Application Data

(63) Continuation of application No. 13/626,785, filed on Sep. 25, 2012.

(51) Int. Cl.
*G06Q 40/02* (2012.01)

(52) U.S. Cl.
CPC .......... *G06Q 40/025* (2013.01); *G06Q 40/02* (2013.01)

(58) Field of Classification Search
CPC .............................. G06Q 40/025; G06Q 10/06
USPC .......................................................... 705/38
See application file for complete search history.

(56) References Cited

U.S. PATENT DOCUMENTS

| | | | | |
|---|---|---|---|---|
| 7,881,993 B2* | 2/2011 | Sarkar | ............ | G06Q 40/02 705/35 |
| 7,966,254 B2* | 6/2011 | Cavey | ............ | G06Q 10/063 705/38 |
| 8,065,227 B1* | 11/2011 | Beckman | ............ | G06Q 40/02 705/39 |
| 2006/0200396 A1 | 9/2006 | Satterfield et al. | | |
| 2006/0212386 A1 | 9/2006 | Willey et al. | | |
| 2006/0271450 A1 | 11/2006 | Cohen et al. | | |
| 2007/0112668 A1* | 5/2007 | Celano | ............ | G06Q 40/02 705/38 |
| 2007/0156557 A1 | 7/2007 | Shao et al. | | |
| 2008/0294547 A1* | 11/2008 | Zigman | ............ | G06Q 10/00 705/38 |
| 2011/0035305 A1 | 2/2011 | Imrey et al. | | |

OTHER PUBLICATIONS

Credit Repair Strategies: Becoming an authorized User Vs. Open a Secured Credit Card, Aug. 2012, from the Internet, 3 pages (Year: 2012).*

(Continued)

*Primary Examiner* — Bruce I Ebersman
(74) *Attorney, Agent, or Firm* — Workman Nydegger

(57) ABSTRACT

A method for taking appropriate action on a credit report for an individual based on analysis of properties of at least some of the trade lines of the credit report. Upon accessing the credit report, each of at least some of the trade lines in the credit report are processed by 1) identifying one or more properties of the subject trade line, 2) performing one or more removal success rate estimations for similar trade lines having at least one like property compared to the subject trade line, and 3) calculating at least one removability index (e.g., an item removal difficulty index or an item removal speed index) for the subject trade line based on the removal success estimation(s). The calculated removability indices are then aggregated for multiple trade lines, and the course of action for the credit report as a whole is determined based on the removability indices.

17 Claims, 7 Drawing Sheets

(56) References Cited

OTHER PUBLICATIONS

PCT/US2013/060180, Notification of Transmittal of the International Search Report and the Written Opinion of the International Searching Authority, or Declaration dated Dec. 27, 2013. (12 pages).
Office Action dated Apr. 17, 2013 from U.S. Appl. No. 13/626,785.
Office Action dated Jan. 17, 2014 from U.S. Appl. No. 13/626,785.
Office Action dated Aug. 1, 2014 from U.S. Appl. No. 13/626,785.

* cited by examiner

CREDIT REPAIR BY ANALYSIS OF TRADE LINE PROPERTIES

CROSS-REFERENCE TO RELATED APPLICATIONS

This patent application claims priority to and is a continuation of U.S. patent application Ser. No. 13/626,785 filed Sep. 25, 2012, which is incorporated herein by reference in its entirety.

BACKGROUND

A credit bureau (also called a Consumer Reporting Agency or CRA) is a company that collects information from various sources about individuals, and aggregates such information into a credit report. Currently, there are three major credit bureaus in the United States including EQUIFAX®, TRANSUNION® and EXPERIAN™.

The credit reports are relied upon by potential and current creditors of the individual, and other authorized entities, when determining whether to take appropriate action regarding the corresponding individual, such as whether to extend credit and under what terms, whether to lease a property, whether to extend an offer of employment, and so forth. Thus, negative items on an individual's credit report can adversely affect the opportunity available to that individual.

Often, a credit score is generated based on the credit report, which allows for a quick and rough approximation of the creditworthiness of the individual. One common credit score used in most applications for credit is called a FICO® SCORE®. FICO and FICO SCORE are registered trademarks of Fair Isaac Corporation. However, there are other scores less commonly used and generated by different algorithms using credit report items as input.

Credit repair services are offered by a number of organizations for the purpose of helping individuals improve their credit scores, thereby improving the opportunities available to the individual. For instance, the credit repair service may impact credit scoring by requesting that credit bureaus demonstrate that an individual's credit report trade lines have been reported fairly and accurately and can be fully substantiated by the associated information providers. For instance, by causing correspondence to be sent to the credit bureaus directly, in the form of an investigative inquiry or perhaps just a dispute regarding a questionable negative item, the credit bureaus may sometimes, but not always, remove that negative item from their credit reports when it is determined that the negative item is either based upon obviously false information, or cannot be readily and fully substantiated, or has not been fairly reported in accordance with applicable consumer protection statutes. Alternatively or in addition, by causing correspondence to be sent to a creditor, the creditor might likewise correspond with the credit bureaus causing the negative item to be removed from affected credit reports. As false, unsubstantiated, or unfairly reported negative items are removed or revised, the individual's credit scores tend to improve.

BRIEF SUMMARY

At least one embodiment described herein relates a computer-implemented method for taking appropriate action on a credit report for an individual using an analysis of properties of at least some of its constituent trade lines. Upon accessing the credit report, each of at least some of the trade lines in the credit report are processed by 1) identifying one or more properties of the trade line, 2) performing one or more removal success rate estimations for similar trade lines having at least one like property, and 3) calculating at least one removability index (e.g., an item removal difficulty index or an item removal speed index) for the trade line based on the removal success estimation(s). The calculated removability indices are then aggregated, and the course of action for the credit report as a whole is determined based on the removability indices.

For instance, as one example, the removability indices may be used in order to identify a sequence in which to intercede on the trade lines. Intercession might be accomplished by, for example, dispatching a letter to a creditor or a credit bureau regarding the trade line. The sequencing may also depend on the anticipated impact of having the trade line removed from the credit report.

The aggregated removability indices may be used to calculate a level of difficulty for improving the credit report, potentially leading to personalized communication with the client. If performed for multiple credit reports for an individual, and factoring in other data such as demographic data, and rate of improvement of credit score, a risk of attrition may be estimated for the individual.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

At least one embodiment described herein relates to a method, such as a computer-implemented method, for taking appropriate action on a credit report for an individual based on analysis of properties of at least some of the trade lines of the credit report. Upon accessing the credit report, each of at least some of the trade lines in the credit report are processed by 1) identifying one or more properties of the subject trade line, 2) performing one or more removal success rate estimations for similar trade lines having at least one like property compared to the subject trade line, and 3) calculating at least one removability index (e.g., an item removal difficulty index or an item removal speed index) for the subject trade line based on the removal success estimation(s). The calculated removability indices are then aggregated for multiple trade lines, and the course of action for the credit report as a whole is determined based on the removability indices.

For instance, as one example, the removability indices may be used in order to identify a sequence in which to intercede on the trade lines. Intercession might be accomplished by, for example, dispatching a letter to a creditor or a credit bureau regarding the trade line. The sequencing may also depend on the anticipated impact of having the trade line removed from the credit report.

The aggregated removability indices may be used to calculate a level of difficulty for improving the credit report. If performed for multiple credit reports for an individual, and factoring in other data such as demographic data, and rate of improvement of credit score, a risk of attrition may be estimated for the individual.

First, some introductory discussion regarding computing systems will be described with respect to FIG. 1. Then, a credit report and credit reporting environment will be described with respect to FIGS. 2 and 3. Then, embodiments of the credit repair system and its operation, in accordance with the principles described herein, will be described with respect to FIGS. 4 through 8.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
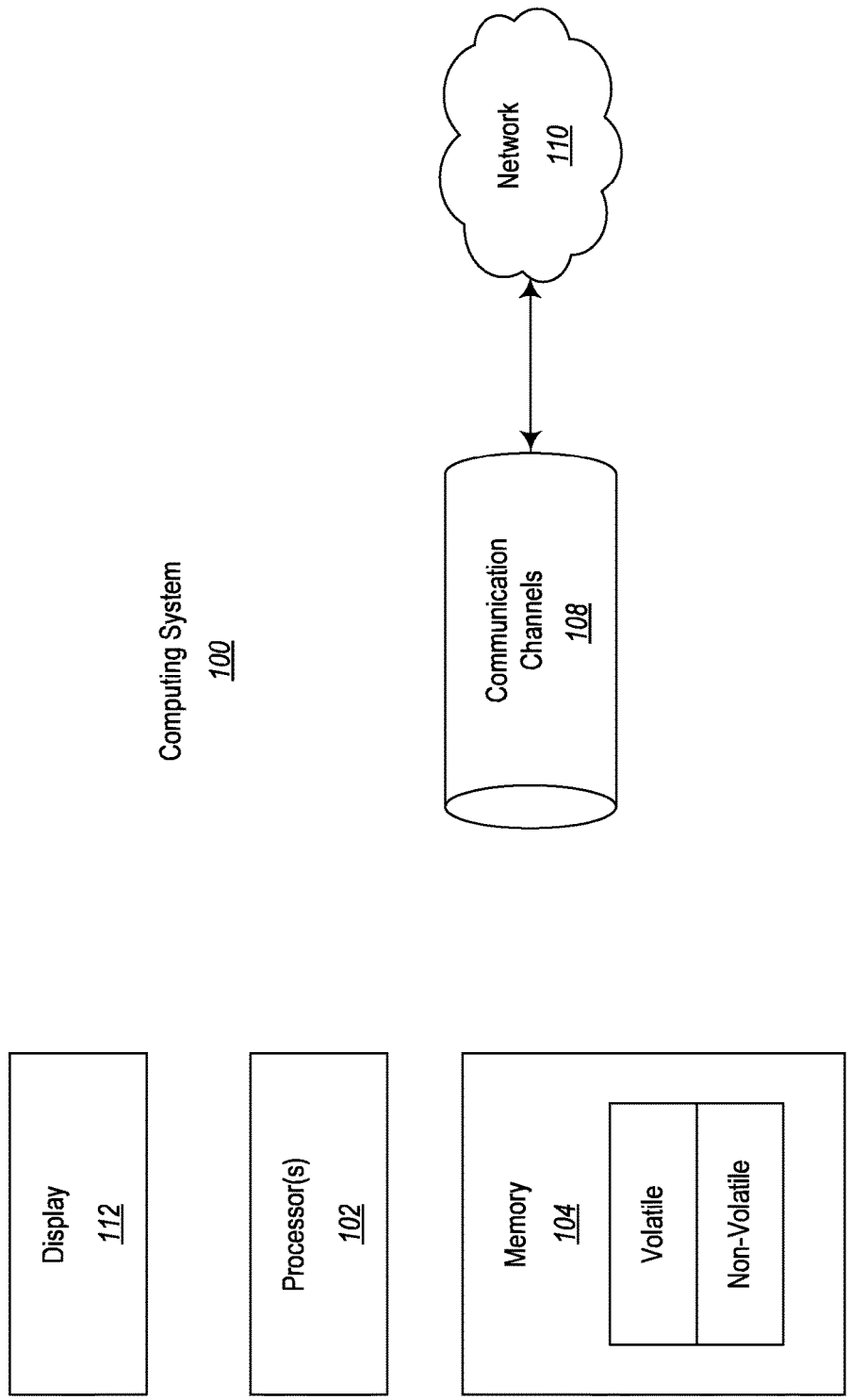
FIG. 1 illustrates a computing system in which some embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110. If interaction with the user is beneficial, the computing system 100 may also include a display 112 and potentially other input/output devices.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Having described a computing system 100 that may implement features of the embodiments described herein, the principles of the novel computer-assisted credit repair techniques will be now be described.

Figure 2:
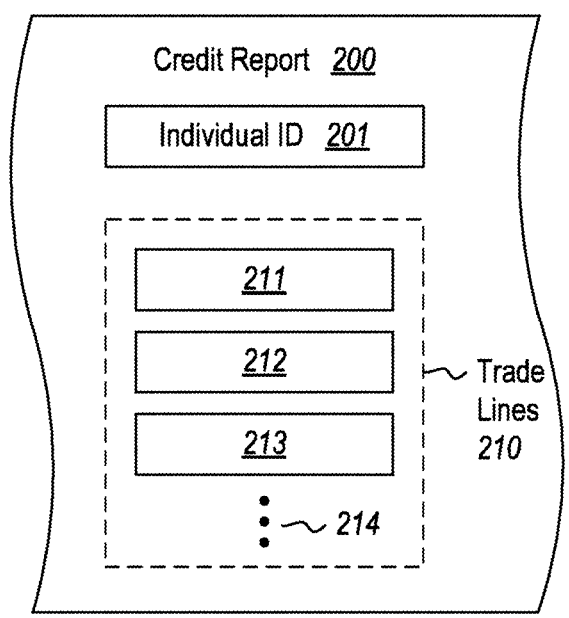
FIG. 2 abstractly illustrates a credit report data structure which includes multiple trade line data structures representing credit report trade lines.

FIG. 2 abstractly represents a credit report 200 that includes a number of trade lines 210 (of which trade lines 211, 212 and 213 are abstractly illustrated) relevant to the creditworthiness of an individual identified in the credit report with an individual identifier 201. The credit report 200 will be referred to herein as a "credit report for an individual" or a "credit report for the individual". The ellipses 214 represent that there may be any number of trade lines 210 in the credit report 200, and will depend on how much information has been provided by creditors and other information providers regarding the individual. A "trade line" is defined herein as any credit report entry. Typically, a trade line will correspond to a credit account attributed to the individual, and may include supplemental information such as, for example, the creditor identifier, the balance, and the status.

Figure 3:
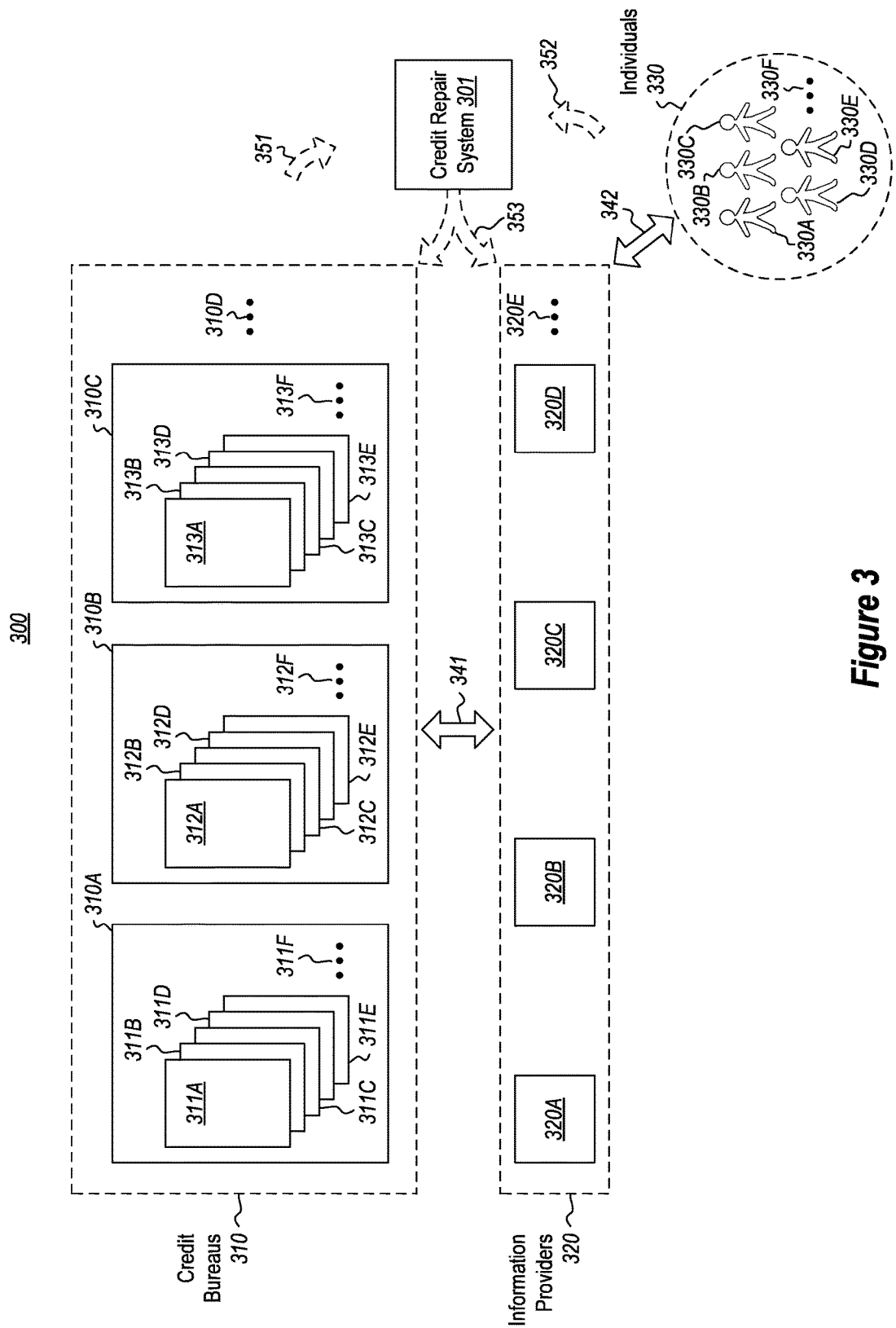
FIG. 3 illustrates a credit reporting environment in which credit reports are generated, including multiple credit bureaus, multiple information providers (such as creditors), multiple individuals, and a credit repair system.

FIG. 3 illustrates a credit reporting environment 300 in which credit reports are generated. The environment 300 includes credit bureaus 310, information providers 320, individuals 330, and a credit repair system 301. The credit bureaus 310 include three credit bureaus 310A, 310B and 310C, although the ellipses 310D represent flexibility in the number of credit bureaus in the environment. In the United States, there are three primary credit bureaus including EQUIFAX®, TRANSUNION™ and EXPERIAN™. However, the principles described herein are not limited to the credit bureaus that operate in a particular region of the world, nor are they limited to currently existing credit bureaus.

The credit bureaus 310 each maintain a credit report for each of the individuals 330. For instance, individuals 330 are illustrated as including five individuals 330A through 330E. Accordingly, the credit bureau 310A maintains credit reports 311A through 311E corresponding to respective individuals 330A through 330E, the credit bureau 310B maintains credit reports 312A through 312E corresponding to respective individuals 330A through 330E, and the credit bureau 310C maintains credit reports 313A through 313E corresponding to respective individuals 330A through 330E. The ellipses 330F represent that there may be any number of individuals about whom the credit bureaus maintain a credit report. This flexibility is represented by ellipses 311F, 312F and 313F. Typically, a credit bureau will maintain a credit report regarding each of many millions of individuals. Each credit report is abstractly represented by an instance of the credit report 200 illustrated in FIG. 2.

The environment 200 also includes information providers 320. There are four information providers 320A through 320D illustrated, although the ellipses 320E represent flexibility in this number. Furthermore, for any given individual, the information providers may be different. Information providers are most typically current or prospective creditors of the individual about whom they are providing information. However, other information providers (such as courts or government agencies) might provide information for the credit report.

Information providers might also consume credit reports corresponding to an individual to whom they may extend credit, lease a property, or extend offers of employment. The potential bi-directional nature of such communication is represented by bi-directional arrow 341. The direct or indirect interaction between the individuals 330 and the information providers 320 that results in the information providers 320 obtaining reportable information regarding the individuals 330 is represented by bi-directional arrow 342. Accordingly, through interaction 341 and 342, credit reports may be generated by credit bureaus 310.

Figure 4:
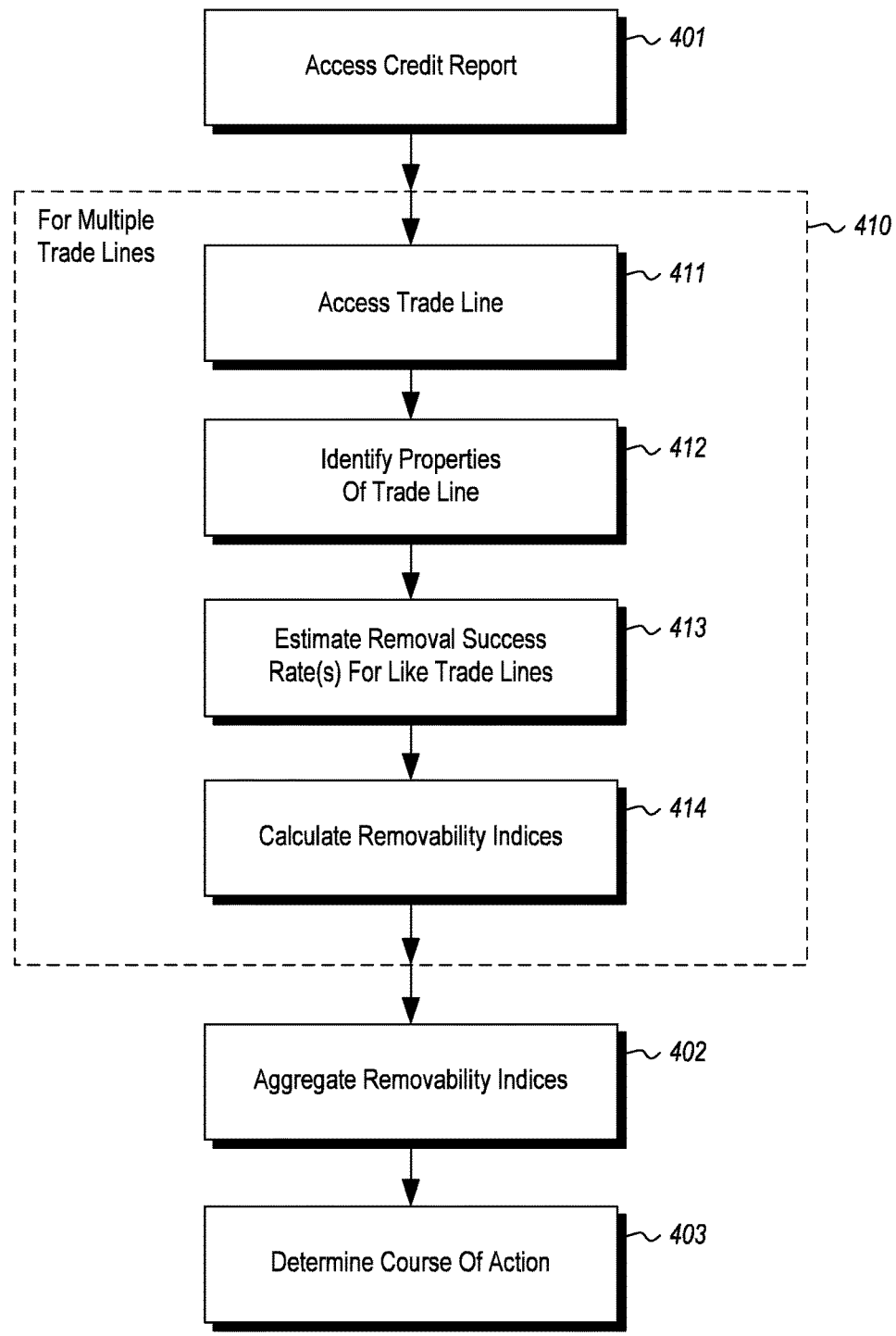
FIG. 4 illustrates a flowchart of a method for determining appropriate action on a credit report using properties of constituent trade lines.

The operation of the credit repair system 301 will now be described with respect to FIGS. 4 through 8. FIG. 4 illustrates a flowchart of a method 400 for determining appropriate action on a credit report using properties of constituent trade lines. In some embodiments, the method 400 may be performed by, for example, the computing system 100 of FIG. 1 implemented in the credit repair system 301 of FIG. 3, although not required.

The method 400 begins by accessing a credit report for an individual (act 401). For instance, referring to FIG. 3, the credit repair system 301 accesses a credit report (e.g., credit report 311A) associated with an individual (e.g., individual 330A). This act might involve accessing the credit report for the individual from multiple credit bureaus. For instance, the credit repair system 301 might access all three credit reports 311A, 312A and 313A from respective credit bureaus associated with a single individual 330A.

The accessing of the credit report may be performed by requesting the corresponding credit report from the credit bureau. In response, as represented by arrow 351 in FIG. 3, the credit bureau responds by dispatching the credit report to the credit repair system 301 as represented by arrow 351 in FIG. 3. For instance, the credit report might be a physical or electronic copy of the credit report. In some embodiments, the credit bureau and the credit repair system may cooperatively interact to exchange data representative of the credit report in which the data is structured accordance with some negotiated schema. For instance, the credit bureau may provide an eXtensible Markup Language (XML) file representing the credit report to the credit repair system 301. As a side note, communications involved in establishing the credit report are represented by solid-lined arrows (e.g., arrows 341 and 342) in FIG. 3. However, communications involved in repairing credit are represented by dotted-lined arrows (e.g., arrows 351, 352 and 353) in FIG. 3.

In some cases, the credit bureau and the credit repair system 301 may not have such an integrated interface. Furthermore, in some cases the credit bureau may not provide even a physical copy of the credit report to the credit repair system 301. In that case, the individual themselves may request the credit report from the credit bureau. Alternatively, the individual may provide authentication credentials to the credit repair system 301, allowing the credit repair system 301 to access the credit report on the individual's behalf online. Both of these cases are represented by the arrow 352 in FIG. 3.

Figure 5:
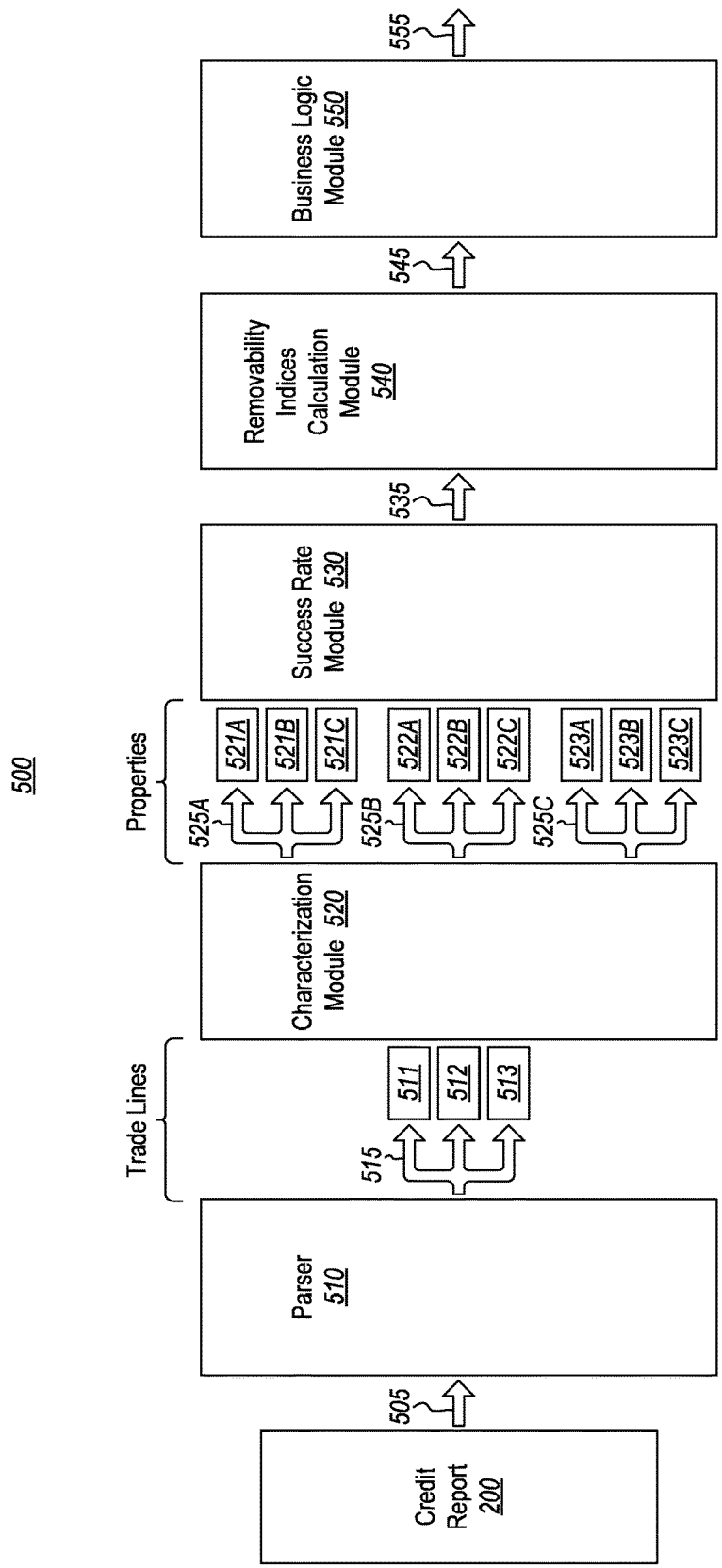
FIG. 5 illustrates a computer architecture that may be represented in memory of a computing system, such as the computing system of FIG. 1, in order to perform the method of FIG. 4.

FIG. 5 illustrates a computer architecture 500 that may be represented in memory of a computing system (such as in the memory 104 of the computing system 100 of FIG. 1), in order to perform the method 400 of FIG. 4. For instance, the computer architecture 500 may be present within a computing system in the credit repair service 301 of FIG. 3. Referring FIG. 5, the credit report 200 is received by the computer architecture as represented by arrow 505.

The various modules 510, 520, 530, 540 and 550 of FIG. 5 may be created in memory by having the computing system accesses computer-executable instructions from memory, and having the computing system executing those computer-executable instructions using one or more digital processors thereby causing the computer architecture 500 of FIG. 5 to be generated and to be operated as described herein. In this description, accessing items "from memory" and providing "to memory" is not to be interpreted as necessitating that "memory" be a single device or type of memory. The memory may be multiple devices, and multiple different types of memory at perhaps different levels of the memory hierarchy all the way from non-volatile storage (locally or remotely located) all the way up to processor registers. Thus, the term "memory" should be interpreted broadly in the description and in the claims.

Referring to FIG. 4, the contents of dashed-lined box 410 are then performed for each of at least some of the trade lines within the one or more credit reports accessed in act 401. If the credit report is provided in physical form, then a human being might type the trade lines from the credit report into a computing system. Referring to FIG. 5, if the credit report is in electronic format, the parser component may parse the credit report (e.g., credit report 200) to access multiple trade lines from the credit report 200. The parser may further generate corresponding trade line data structures 511 through 513 corresponding to trade lines 211 through 213 of the credit report 200. The number of trade lines extracted by the parser 510 is, however, flexible. The principles described herein do not require that all trade lines be parsed, though it is helpful to parse more.

If the credit report is an image file, the parser 510 may perform text recognition. If the credit report is in text format, the parser 510 may scan the text to find the boundaries of the trade lines. If the credit report is in a predetermined schema (e.g., in XML format), then the parser 510 may perform XML parsing.

The trade line data structures are "passed" from the parser to the characterization module 520 as represented by arrow 515. In this description and in the claims, when a source module of a computer architecture "passes" a data structure to a target module, this means that the source module causes the target module to be able to access the data structure. For instance, one way to do this is to simply provide the data structure to memory at a location that may then be accessed by the target module. Such passing is represented by rightward-facing arrows in FIG. 5.

Referring back to FIG. 4, for each of at least some of the parsed trade lines, the trade line is then accessed (act 411), and a set of one or more properties of the trade line are identified (act 412). Examples of properties of trade lines include 1) whether the trade line is an installment (for an installment loan) or revolving (e.g., a revolving line of credit), 2) the severity type of the trade line, 3) a balance range of the trade line, 4) a utilization ratio range of the trade line and 5), a creditor identity for the trade line.

Examples of severity level values include 30 day, 60 day, 90 day, 120+ day, Charge-off, Collection, Incl in BK, Bankrupcy, Settlement, Repossession, Lien, Judgment, Garnishment, Foreclosure. Examples of balance range values include 0 to 250 dollars, 251 to 500 dollars, 501 to 750 dollars, 751 to 1000 dollars, 1001 to 2500 dollars, 2501 to 5000 dollars, and 5001 dollars and above. Examples of utilization ratio range values include 0 to 10 percent, 10.1 to 30 percent, 30.1 to 50 percent, 50.1 to 70 percent, 70.1 to 80 percent, 80.1 to 90 percent, and 90.1 to 100 percent. Examples of creditor identifier values are names of specific banks, utility companies, collection companies, retail stores, credit card providers, and so forth.

If the method 400 is performed by the computing system 100 in the credit repair system 301, a trade line characterization module 520 identifies a set of one or more properties of the subject trade line (act 412). For instance, the trade line characterization module 520 accesses the digital representation of the trade line 511, identifies a set of one of more properties of the trade line using the accessed trade line digital representation 511, and provides a digital representation 521A, 521B and 521C of the set of one or more properties into memory as represented by arrow 525A. Furthermore, the trade line characterization module 520 accesses the digital representation of the trade line 512, identifies a set of one of more properties of the trade line using the accessed trade line digital representation 512, and provides a digital representation 522A, 522B and 522C of the set of one or more properties into memory as represented by arrow 525B. Also, the trade line characterization module 520 accesses the digital representation of the trade line 513, identifies a set of one of more properties of the trade line using the accessed trade line digital representation 513, and provides a digital representation 523A, 523B and 523C of the set of one or more properties into memory as represented by arrow 525C.

Of course, while in this example each trade line is identified as having three properties, the trade line characterization module 520 may identify any number of properties from the corresponding trade line. For instance, the trade line characterization module 520 might identify 1) the severity level, 2) installment versus revolving, 3) balance range, and 4) creditor name.

Referring back to FIG. 4, one or more removal success rate estimations are then made for like trade likes that have all or a subset of the one or more properties of the subject trade line. For instance, this estimation may be made based on historical success rates for trade lines having one of the properties of the subject trade line. Suppose, for example, that a particular trade line (also referred to as the "subject trade line") being evaluated has the following four property values:

1) Severity Type: Collection
2) Installment versus Revolving: Revolving
3) Balance Level: 501 to 750 dollars
4) Creditor: Fiction Bank, Inc.

In this case, the act 413 might involve calculating as few as one, and as many as four removal success rate estimations. The case of calculating four removal success rate estimations will first be described.

In the case of four removal success rate estimations, to calculate a first remove success rate estimation, the historical performance of the trade lines that also have the first property value "Collection" of the first property "Severity Type" is determined. For instance, suppose that taking all the trade lines having this Severity Type of value Collections, there has been a success rate (referred to as SRA in equation 1 for Success Rate Actual) in response to a single intercession (e.g., the sending of a targeted letter to the creditor or credit agency) of 21%. This value may be compared to the average success rate (referred to as SRE in equation 1 for Success Rate Expected) for a single intercession for all trade lines of 20%. Thus, if a trade line is a Collection trade line, there is a slightly better chance than random of having an intercession be successful. In one embodiment, a removal success rate estimation might be defined by the following Equation 1, where RSRE is the removal success rate estimation.

$$RSRE = N * ((SRE - SRA)/SRE) \quad (1)$$

Suppose that N is 1000 (but may be arbitrary), this would result in the first RSRE value (corresponding to "Collection" severity type) being $1000*((0.20-0.21)/0.2)$, which reduces to $1000*(-0.01/0.2)$, which equals −50. Thus $RSRE_1$ equals −50.

This same Equation 1 may be used again for the second removal success rate estimation ($RSRE_2$), which is determined by evaluating historical removal success rate estimate for all trade lines in which the installment versus revolving value matches that of the subject trade line being evaluated. In this case, that property value is Revolving. For instance, suppose that taking all the trade lines of a Revolving type, there has been a single intercession success rate of 12%. This value may be compared to the average single intercession success rate for all trade lines of 20%. Thus, if a trade line is a Revolving type, there is a much less chance than random of having an intercession be successful. Applying Equation 1 for $RSRE_2$ should then yield $1000*(0.2-0.12/0.2)$, which equals 400. Thus, we see that positive values for RSRE result in an estimation that these types of trade lines are less successful than average after a single intercession, whereas negative values for RSRE result in an estimation that these types of trade lines are more successful than average after a single intercession.

Equation 1 may be used again for the third removal success rate estimation ($RSRE_3$), which is determined by evaluating historical removal success rates for all trade lines in which the balance level value matches that of the trade line being evaluated (in this case, 501 to 750 dollars). For instance, suppose that taking all the trade lines of a balance level of 501 to 750 dollars, there has been a single intercession success rate of 25%. This value may be compared to the average single intercession success rate for all trade lines of 20%. Thus, if a trade line is a Revolving type, there is a greater chance than random of having an intercession be successful. Applying Equation 1 for $RSRE_3$ should then yield $1000*(0.2-0.25/0.2)$, which equals −250.

Equation 1 may finally be used for the last removal success rate estimation ($RSRE_4$), which is determined by evaluating historical removal success rates for all trade lines in which the creditor identifier value matches that of the trade line being evaluated (in this case, Fictional Bank, Inc.). Needless to say, "Fictional Bank, Inc." is not intended to refer to any specific bank, but is just a fabricated name used simply for the purpose of this description. For instance, suppose that taking all the trade lines for the Fictional Bank, Inc., there has been a single intercession success rate of 20%. This value may be compared to the average single intercession success rate for all trade lines of 20%. Thus, if a trade line corresponds to Fictional Bank, Inc., there is just as much of a chance of a successful intercession as random. Applying Equation 1 for $RSRE_4$ should then yield $1000*(0.2-0.20/0.2)$, which equals zero.

Thus, in this case, where a removal success rate estimate ($RSRE_1$, $RSRE_2$, $RSRE_3$ and $RSRE_4$) was calculated for each of the four properties of the subject trade line, there are likewise four removal success rate estimates. In another embodiment, there is but one removal success rate estimate. In yet other embodiments, there is some number of estimates between one and the number of properties in the subject property. This description will return to these alternative embodiments further below. But for now, this description will progress further through FIG. 4.

Referring back to FIG. 4, the credit report system then calculates at least one removability index for the trade line based on the at least one removal success estimation (act 414). For instance, in the case of there being one removal success rate estimation RSRE for every property of the trade line, the following values were derived in the example:

$RSRE_1 = -50$;
$RSRE_2 = 400$;
$RSRE_3 = -250$; and
$RSRE_4 = 0$.

The calculation of the removability index might be obtained by using these four factors. For instance, the four RSRE values might be simply summed, which would lead to a removability index of positive 100 (e.g., −50+400−250+0). Of course, other more complex functions might also be used. The removability index might be referred to as an "item difficulty valence" or "IDV" herein.

In some embodiments, as an alternative or in addition to calculating the IDV, another removability index may be calculated. For instance, such might be referred to as an "item speed valence" or "ISV". In this case, different RSRE values might be calculated for each of the four properties based on an average speed in which like trade lines are resolved, when they are resolved. A similar calculation on these other RSRE values may be used to determine in ISV for the trade line. These removability indices are, however, just examples. Any removability index for a trade line that provides some clue as to the likelihood and/or speed in being able to remove the trade line from the credit report will suffice consistent with the broader principles described herein.

In this example, four RSRE values were used to calculate a single IDV value for a trade line. In an alternative embodiment, a single RSRE value might have been calculated. For instance, consider the same example in which there is a trade line for a revolving line of credit from Fiction Bank, Inc. that was in collection, and having a balance in the range of 501 to 750 dollars. If the historical data was refined enough, there might be enough of a sample size to be able to determine historical success rates for exactly those types of trade lines that have all four properties being the same. For instance, if the overall success rate was 18.5 percent for exactly that type of trade line, Equation 1 might be applied to determine a single RSRE value ($RSRE_{1234}$) of $1000*((0.2-0.185)/0.2)$, which equals 75. In this case, the calculation of the IDV value (in act 414) might be trivial, and just made equal to the RSRE value. An ISV value may be calculated in a similar way if there is sufficient historical speed data regarding trade lines of that exact type.

Accordingly, two examples have been described, a first in which four RSRE values were determined ($RSRE_1$, $RSRE_2$, $RSRE_3$ and $RSRE_4$) and the removability index calculated based on those four factors, and a second in which a single RSRE value was determined ($RSRE_{1234}$) and the removability index calculated based on that factor. However, in hybrid approaches, there might be only two RSRE values calculated, one based on one property (e.g., $RSRE_1$) and one based on a combination of the other properties (e.g., $RSRE_{234}$). All other permutations are contemplated to be within the scope of the principles described herein. Also, all manner of calculation of the RSRE values are also contemplated to be within the scope of the principles described herein.

In any case, if the calculation of the removability index is performed by a computing system 100 in the context of the credit repair system 301 of FIG. 3, the calculation may be performed by, for example, the removability indices calculation module 540, which receives the removal success estimations as represented by arrow 535. For instance, the removability indices calculation module 540 may access the removal success estimations from memory, calculate the removability indices and digitally represent such as a removability index data structure, and provide the digital representation of the removability indices into memory as represented by arrow 545.

The contents of box 410 may be performed for multiple trade lines as previously mentioned. Accordingly, one or more removability indices for each of multiple trade lines may be aggregated (act 402). Then, a course of action may then be determined based on the calculated removability indices (act 403). For instance, if performed by a computer system 100 in the credit repair system 301, a business logic module 550 accesses the digital representations of the removability indices from memory as represented by arrow 545, calculates an appropriate action based on this input, which the appropriate action represented by arrow 555.

Figure 6:
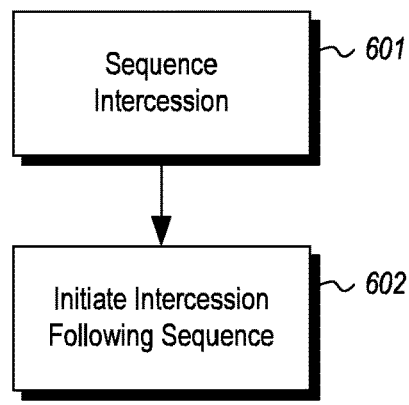
FIG. 6 illustrates a flowchart of a method for performing a first course of action including the sequencing of intercession for the trade lines.

FIG. 6 illustrates a flowchart of a method 600 for accomplishing a first course of action. In this embodiment, the course of action is that a sequence of intercession of the trade lines is embarked upon. An example of an intercession with respect to trade line is the dispatching of a targeted letter regarding the trade line to the corresponding creditor or to the credit bureau. This dispatching is represented by the arrow 353 in FIG. 3. First, the method 600 includes sequencing initiation of intercession associated with trade lines corresponding to the calculated removability indices at least in part based on the calculated removability indices (act 601). Client preferences may be used to perform this sequencing, in addition to consulting the calculated removability indices. Easier intercessions that result in greater impact on credit score might, for example, be targeted for earlier action to that the client can experience more rapid early improvement in the credit score. Such may help the client realize the effectiveness of the credit repair service 301.

Once the sequence is generated, intercession may be initiated according to the sequence (act 602). For instance, when it is time to initiate intercession associated with a trade line, a physical letter relating to the trade line is mailed to a creditor associated with the trade line, or a credit bureau associated with the credit report. However, the principles described herein are not limited to any particular type of intercession mechanism. Other communication mechanisms such as in person, telephonic, or electronic may also be used to intercede for the client for a given trade line.

In the embodiments described above, the statistics associated with historical success rates were evaluated based on actual empirical success rates based on trade lines having similar properties to the subject trade line. However, the intercession methodology was left generic in this analysis. However, the statistical analysis may be further refined by evaluating historical success rates associated with different intercession methodology. For instance, one intercession methodology might be to send a letter of a first type to a creditor, whereas another methodology might be to send a letter of a second type to the creditor, and yet a third methodology might be to send a letter of a third type to the credit bureau. Refined estimates of success may thus be determined based not only on the historical success rates of like trade lines, but alternatively or addition, may be based upon different intercession methodologies. Thus, in addition to choosing a sequencing of intercession, the intercession methodology for each trade line may also be determined.

Figure 7:
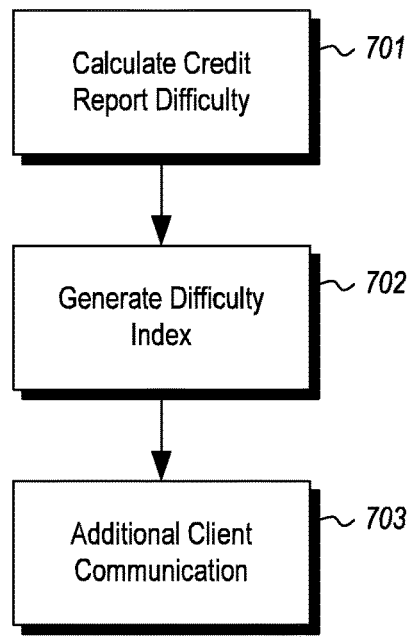
FIG. 7 illustrates a flowchart of a method for performing a second course of action including determining a difficulty of the credit report.

FIG. 7 illustrates a flowchart of a method 700 corresponding to a second course of action. In this second course of action, a relative difficulty in improving the credit report is calculated based on the aggregated removability indices (act 701). The method 700 generates an index of difficulty for the credit report (702). For instance, this difficulty index may be proportional to the sum of the removability indices of the various trade lines in the credit report. The method 700 then involves performing additional client communications based on the calculated difficulty in improving the credit report (act 703). For instance, telephonic, electronic or postal communications may be dispatched to the client, particularly if the credit report is anticipated to be a difficult case for credit repair.

Figure 8:
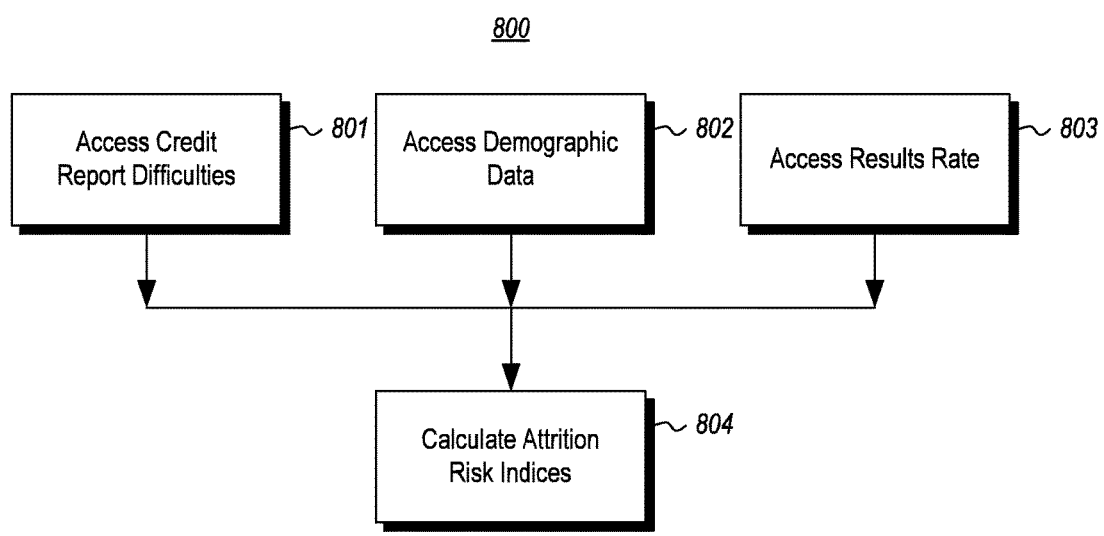
FIG. 8 illustrates a flowchart of a method for performing a third course of action including determining an attrition risk for the client.
Figure 2:
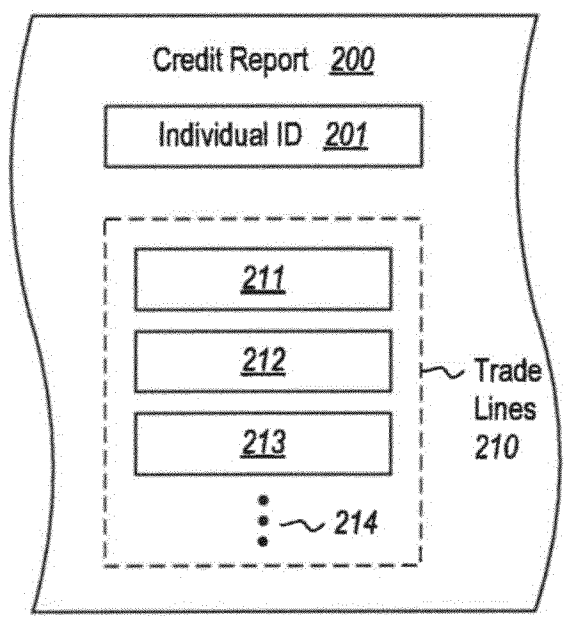
Figure 3:
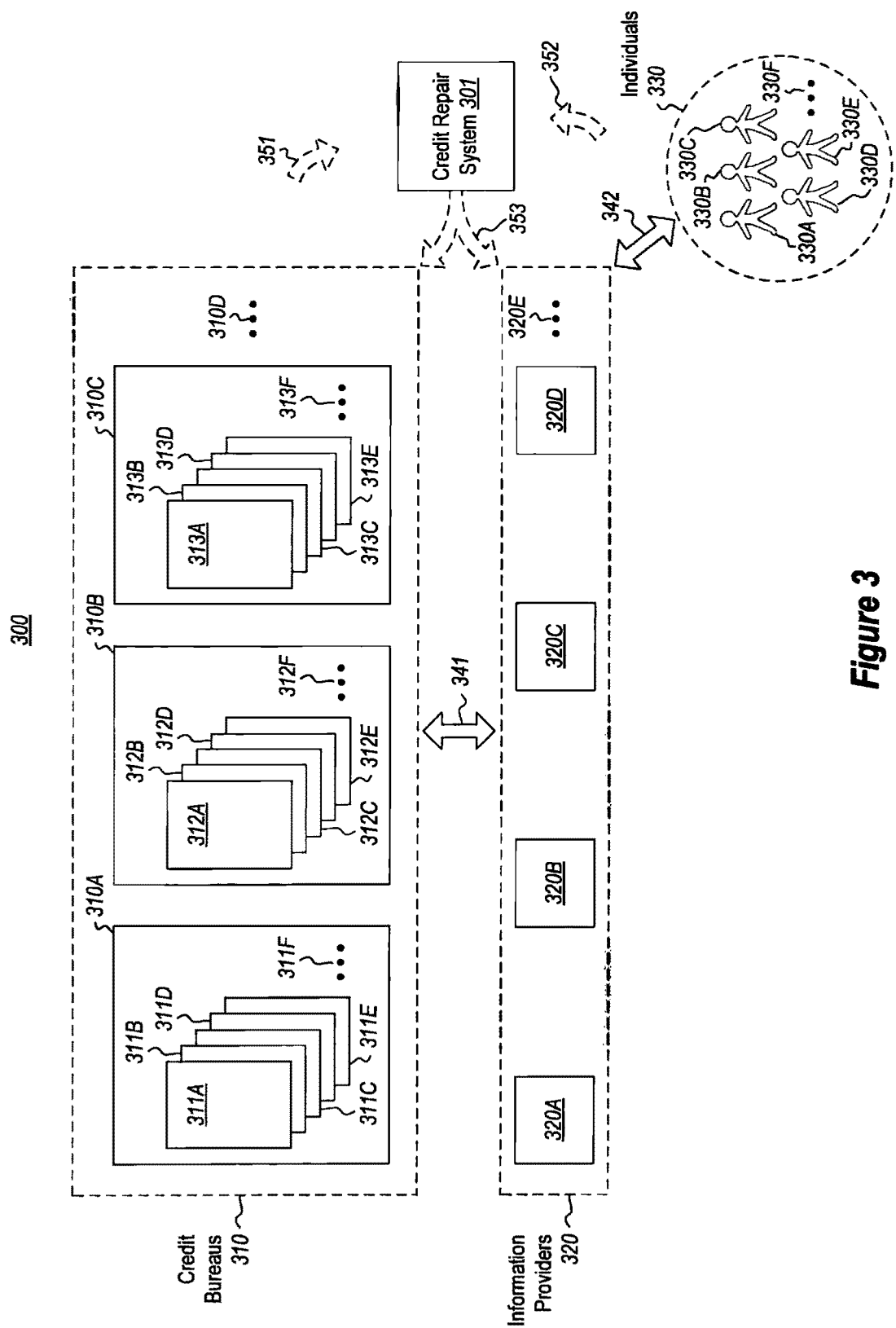
Figure 4:
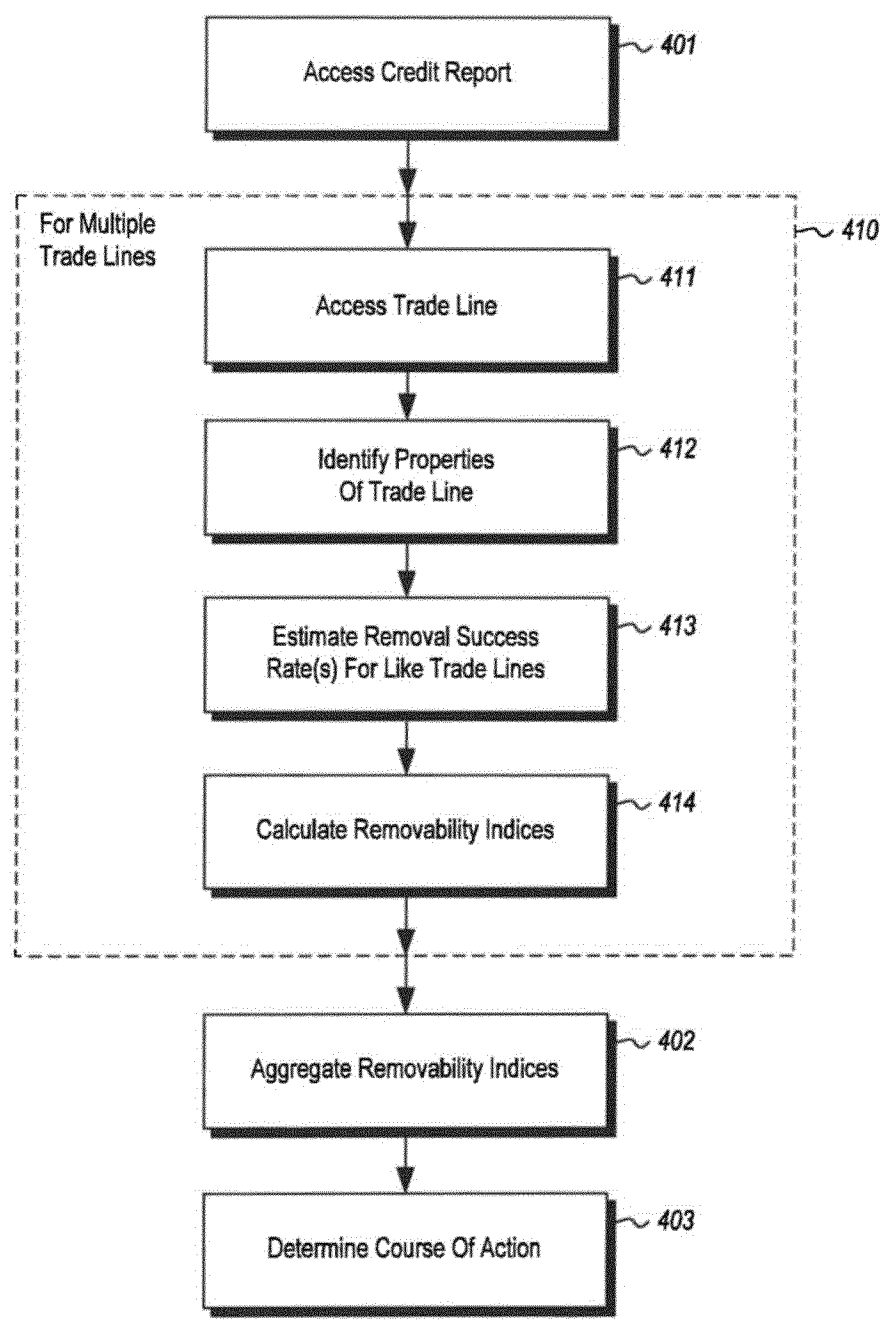
Figure 6:
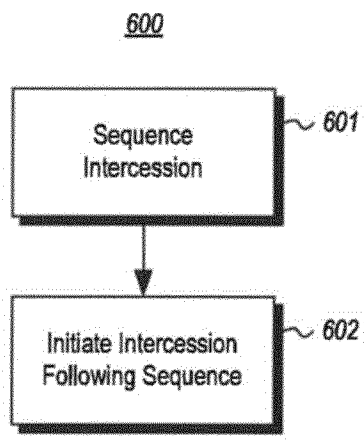
Figure 7:
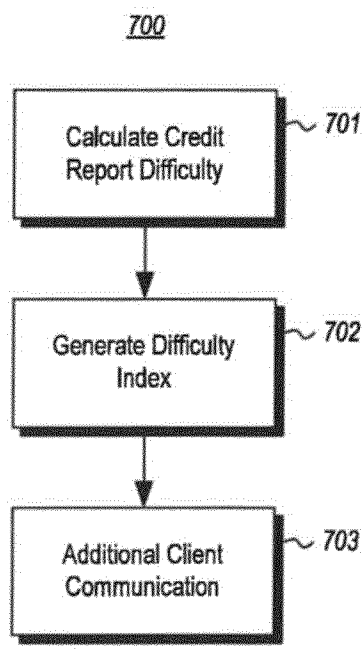
Figure 8:
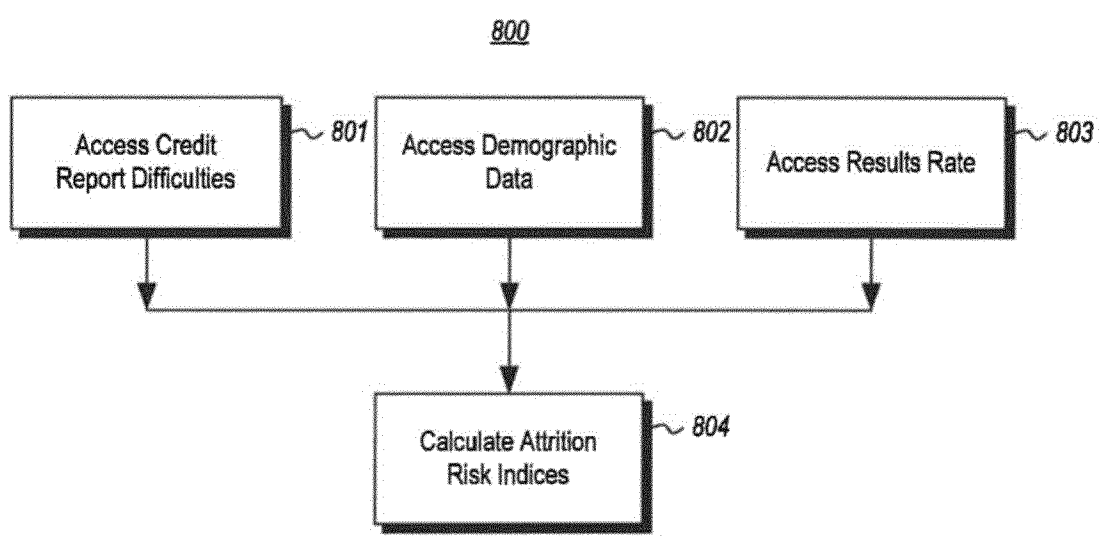

FIG. 8 illustrates a flowchart of a method 800 corresponding to a third course of action associated with estimating a risk of attrition of a client requesting improvement of a credit report of the individual. In this method 800, a calculated difficulty in improving the credit report is accessed (act 801). For instance, the difficulty index calculated in act 702 of method 700 may be accessed. As the credit repair service 301 may access various iterations of the credit report, the difficulty index associated with prior iterations of the credit report may also be accessed (also act 801). Also, demographics of the client may be accessed (act 802), in addition to a results rate in improving the credit report of the individual (act 803). Based on these input factors, a risk of attribution associated with the client may be calculated (act 804). Such calculation may, for example, be based on historical data regarding attrition of prior clients.

Accordingly, the principles described herein provide an advanced mechanism for evaluating credit repair techniques. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method implemented by a computing system, comprising:
   accessing, by a computing system, computer-executable instructions, and executing those computer-executable instructions using one or more digital processors thereby causing the following to be performed for each of at least some of a plurality of trade lines in a credit report:

the computing system accessing the credit report having the plurality of trade lines;

the computing system determining whether the credit report is in a text format or an XML format;

the computing system parsing the credit report to identify one or more trade lines within the credit report by selectively (1) performing text recognition if it is determined the credit report is in a text format and by at least identifying boundaries of the one or more trade lines within the credit report, and (2) performing XML parsing if it is determined the credit report is in an XML format;

the computing system generating a digital representation of one or more trade lines identified from the parsing;

the computing system accessing the digital representation of the one or more trade lines, identifying a set of at least four separate properties for each of the one or more trade lines using the accessed digital representation of the one or more trade lines, and providing a digital representation of the set of the at least four separate properties, the at least four separate properties including (i) a trade line type, (ii) a trade line utilization (iii) a trade line creditor identifier and (iv) a trade line severity that has a corresponding rule defining a set of predetermined numeric value ranges usable to characterize and assign a severity level for the trade line severity property;

the computing system referencing the digital representation of the set of properties to perform a removal success rate estimation for each of the at least four separate properties, such that at least four separate removal success rate estimations are generated for the corresponding at least four separate properties, respectively;

the computing system formulating a digital representation of each of the at least four removal success rate estimations, and providing the digital representation of each of the at least four removal success rate estimations to a removability index calculation module;

the computing system referencing the digital representation of the at least four removal success rate estimations to calculate a single removability index value that is based on all of the at least four separate removal success rate estimations for a corresponding trade line and that indicates at least an ability to remove the corresponding trade line from the credit report;

the computing system formulating a digital representation of the calculated single removability index for the corresponding trade line;

the computing system initiating an automated intercession associated with the one or more trade lines based on the calculated single removability index, wherein initiating the automated intercession includes the computing system sequencing a plurality of different intercessions into a sequence of intercessions to be performed based on relative effectiveness of the plurality of different intercessions for removing the corresponding trade line, and selecting a particular intercession in the sequence of intercessions that has a higher effectiveness for removing the corresponding trade line than at least one other intercession in the sequence of intercessions, such that the automatically performing the automated intercession includes automatically performing the particular intercession in the sequence of intercessions before the at least one other intercession, the automated intercession including generation of a plurality of letters to be dispatched to different entities, including a first letter of a first type to a first entity comprising a creditor and a second letter of a different type to a second entity comprising a credit bureau; and the computing system automatically performing the automated intercession by at least generating the plurality of letters of the different types for dispatch to the different entities based at least on the calculated removability index.

2. The method in accordance with claim 1, wherein the severity type of the trade line is a foreclosure type.

3. The method in accordance with claim 1, wherein the trade line type specifies whether the trade line is an installment type or a revolving type.

4. The method in accordance with claim 1, wherein the trade line utilization property comprises a balance range.

5. The method in accordance with claim 1, wherein the creditor identity is selected from a group consisting of: a utility company, a collection company, a retail store, a specific bank name, and a credit card provider.

6. The method in accordance with claim 1, wherein at least one of the removal success rate estimations having a digital representation formed by the removal success rate module comprises:

a historical success rate for trade lines for trade lines having a first property of the set of one or more properties of the trade line.

7. The method in accordance with claim 6, wherein historical success rate is a first historical success rate, the at least one of the removal success rate estimations having the digital representation formed by the removal success rate module further comprising:

a second historical success rate for trade lines having a second property of the set of one or more properties of the trade line.

8. The method in accordance with claim 6, wherein historical success rate is a first historical success rate, the at least one of the removal success rate estimations having the digital representation formed by the removal success rate module further comprising:

a second historical success rate for trade lines having at least a second property and a third property of the set of one or more properties of the trade line.

9. The method in accordance with claim 1, wherein the at least one removal success rate comprises a single historical success rate for trade lines having all of the set of one or more properties of the trade line.

10. The method in accordance with claim 1, wherein the determined course of action includes calculating a relative difficulty in improving the credit report based on the aggregated plurality of removability indices.

11. The method in accordance with claim 10, wherein the determined course of action is also estimating a risk of attrition of a client requesting improvement of a credit report of the individual, the estimated risk of attrition at least based on the calculated relative difficulty in improving the credit report, as well as calculated relative difficulty in improving previous instances of the credit report of the individual.

12. The method in accordance with claim 1, wherein the determined course of action is estimating a risk of attrition of a client requesting improvement of a credit report of the individual.

13. The method in accordance with claim 12, wherein estimating the risk of attrition of the client is further based on demographic client demographics.

14. The method in accordance with claim 12, wherein estimating the risk of attrition of the client is further based on a results rate in improving the credit report.

15. The method in accordance with claim 1, wherein the set of one or more properties of at least one of the trade lines having a digital representation accessed by the trade line characterization module comprises a utilization ratio range of the trade line.

16. A computing system comprising:
one or more processors; and
one or more hardware storage device having stored computer-executable instructions which are executable by the one or more processors for causing the computing system to implement a method that includes: the computing system accessing the credit report having the plurality of trade lines;
the computing system determining whether the credit report is in a text format or an XML format;
the computing system parsing the credit report to identify one or more trade lines within the credit report by selectively (1) performing text recognition if it is determined the credit report is in a text format and by at least identifying boundaries of the one or more trade lines within the credit report, and (2) performing XML parsing if it is determined the credit report is in an XML format;
the computing system generating a digital representation of one or more trade lines identified from the parsing;
the computing system accessing the digital representation of the one or more trade lines, identifying a set of at least four separate properties for each of the one or more trade lines using the accessed digital representation of the one or more trade lines, and providing a digital representation of the set of the at least four separate properties, the at least four separate properties including (i) a trade line type, (ii) a trade line utilization (iii) a trade line creditor identifier and (iv) a trade line severity that has a corresponding rule defining a set of predetermined numeric value ranges usable to characterize and assign a severity level for the trade line severity property;
the computing system referencing the digital representation of the set of properties to perform a removal success rate estimation for each of the at least four separate properties, such that at least four separate removal success rate estimations are generated for the corresponding at least four separate properties, respectively;
the computing system formulating a digital representation of each of the at least four removal success rate estimations, and providing the digital representation of each of the at least four removal success rate estimations to a removability index calculation module;
the computing system referencing the digital representation of the at least four removal success rate estimations to calculate a single removability index value that is based on all of the at least four separate removal success rate estimations for a corresponding trade line and that indicates at least an ability to remove the corresponding trade line from the credit report;
the computing system formulating a digital representation of the calculated single removability index for the corresponding trade line;
the computing system initiating an automated intercession associated with the one or more trade lines based on the calculated single removability index, wherein initiating the automated intercession includes the computing system sequencing a plurality of different intercessions into a sequence of intercessions to be performed based on relative effectiveness of the plurality of different intercessions for removing the corresponding trade line, and selecting a particular intercession in the sequence of intercessions that has a higher effectiveness for removing the corresponding trade line than at least one other intercession in the sequence of intercessions, such that the automatically performing the automated intercession includes automatically performing the particular intercession in the sequence of intercessions before the at least one other intercession, the automated intercession including generation of a plurality of letters to be dispatched to different entities, including a first letter of a first type to a first entity comprising a creditor and a second letter of a different type to a second entity comprising a credit bureau; and
the computing system automatically performing the automated intercession by at least generating the plurality of letters of the different types for dispatch to the different entities based at least on the calculated removability index.

17. One or more hardware storage device having stored computer-executable instructions which are executable by the one or more processors of a computing system for causing the computing system to implement a method that includes:
the computing system accessing the credit report having the plurality of trade lines;
the computing system determining whether the credit report is in a text format or an XML format;
the computing system parsing the credit report to identify one or more trade lines within the credit report by selectively (1) performing text recognition if it is determined the credit report is in a text format and by at least identifying boundaries of the one or more trade lines within the credit report, and (2) performing XML parsing if it is determined the credit report is in an XML format;
the computing system generating a digital representation of one or more trade lines identified from the parsing;
the computing system accessing the digital representation of the one or more trade lines, identifying a set of at least four separate properties for each of the one or more trade lines using the accessed digital representation of the one or more trade lines, and providing a digital representation of the set of the at least four separate properties, the at least four separate properties including (i) a trade line type, (ii) a trade line utilization (iii) a trade line creditor identifier and (iv) a trade line severity that has a corresponding rule defining a set of predetermined numeric value ranges usable to characterize and assign a severity level for the trade line severity property;
the computing system referencing the digital representation of the set of properties to perform a removal success rate estimation for each of the at least four separate properties, such that at least four separate removal success rate estimations are generated for the corresponding at least four separate properties, respectively;
the computing system formulating a digital representation of each of the at least four removal success rate estimations, and providing the digital representation of each of the at least four removal success rate estimations to a removability index calculation module;
the computing system referencing the digital representation of the at least four removal success rate estimations to calculate a single removability index value that is based on all of the at least four separate removal success rate estimations for a corresponding trade line and that indicates at least an ability to remove the corresponding trade line from the credit report;

the computing system formulating a digital representation of the calculated single removability index for the corresponding trade line;

the computing system initiating an automated intercession associated with the one or more trade lines based on the calculated single removability index, wherein initiating the automated intercession includes the computing system sequencing a plurality of different intercessions into a sequence of intercessions to be performed based on relative effectiveness of the plurality of different intercessions for removing the corresponding trade line, and selecting a particular intercession in the sequence of intercessions that has a higher effectiveness for removing the corresponding trade line than at least one other intercession in the sequence of intercessions, such that the automatically performing the automated intercession includes automatically performing the particular intercession in the sequence of intercessions before the at least one other intercession, the automated intercession including generation of a plurality of letters to be dispatched to different entities, including a first letter of a first type to a first entity comprising a creditor and a second letter of a different type to a second entity comprising a credit bureau; and the computing system automatically performing the automated intercession by at least generating the plurality of letters of the different types for dispatch to the different entities based at least on the calculated removability index.

* * * * *

UNITED STATES PATENT AND TRADEMARK OFFICE
CERTIFICATE OF CORRECTION

PATENT NO. : 10,229,455 B2
APPLICATION NO. : 14/611013
DATED : March 12, 2019
INVENTOR(S) : Padawer It is certified that error appears in the above-identified patent and that said Letters Patent is hereby corrected as shown below:

Please delete Patent No. 10,229,455 B2 in its entirety and insert Patent No. 10,229,455 B2 in its entirety as shown on the attached pages.

Signed and Sealed this
Sixth Day of August, 2019

Andrei Iancu
*Director of the United States Patent and Trademark Office*

(12) United States Patent
Padawer

(10) Patent No.: US 10,229,455 B2
(45) Date of Patent: Mar. 12, 2019

(54) CREDIT REPAIR BY ANALYSIS OF TRADE LINE PROPERTIES

(71) Applicant: Progrexion IP, Inc., North Salt Lake, UT (US)

(72) Inventor: Justin Randall Padawer, Bountiful, UT (US)

(73) Assignee: PROGREXION IP, INC., North Salt Lake, UT (US)

(*) Notice: Subject to any disclaimer, the term of this patent is extended or adjusted under 35 U.S.C. 154(b) by 75 days.

(21) Appl. No.: 14/611,013

(22) Filed: Jan. 30, 2015

(65) Prior Publication Data
US 2015/0142639 A1    May 21, 2015

Related U.S. Application Data

(63) Continuation of application No. 13/626,785, filed on Sep. 25, 2012.

(51) Int. Cl.
G06Q 40/02    (2012.01)

(52) U.S. Cl.
CPC .......... *G06Q 40/025* (2013.01); *G06Q 40/02* (2013.01)

(58) Field of Classification Search
CPC .................... G06Q 40/025; G06Q 10/06
USPC ........................................... 705/38
See application file for complete search history.

(56) References Cited

U.S. PATENT DOCUMENTS 7,881,993 B2 *  2/2011  Sarkar ............... G06Q 40/02
                                              705/35
7,966,254 B2 *  6/2011  Cavey ............... G06Q 10/063
                                              705/38
8,065,227 B1 *  11/2011 Beckman ........... G06Q 40/02
                                              705/39
2006/0200396 A1   9/2006  Satterfield et al.
2006/0212386 A1   9/2006  Willey et al.
2006/0271450 A1  11/2006  Cohen et al.
2007/0112668 A1 *  5/2007  Celano ............... G06Q 40/02
                                              705/38
2007/0156557 A1   7/2007  Shao et al.
(Continued)

OTHER PUBLICATIONS

Credit Repair Strategies: Becoming an authorized User Vs. Open a Secured Credit Card, Aug. 2012, from the Internet, 3 pages (Year: 2012).*

(Continued)

*Primary Examiner* — Bruce I Ebersman
(74) *Attorney, Agent, or Firm* — Workman Nydegger

(57) ABSTRACT

A method for taking appropriate action on a credit report for an individual based on analysis of properties of at least some of the trade lines of the credit report. Upon accessing the credit report, each of at least some of the trade lines in the credit report are processed by 1) identifying one or more properties of the subject trade line, 2) performing one or more removal success rate estimations for similar trade lines having at least one like property compared to the subject trade line, and 3) calculating at least one removability index (e.g., an item removal difficulty index or an item removal speed index) for the subject trade line based on the removal success estimation(s). The calculated removability indices are then aggregated for multiple trade lines, and the course of action for the credit report as a whole is determined based on the removability indices.

17 Claims, 7 Drawing Sheets

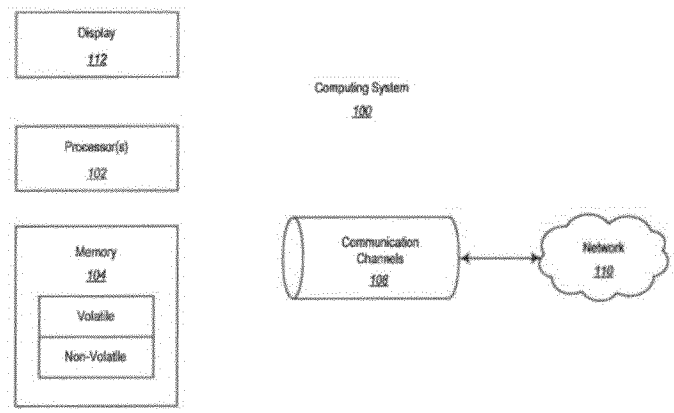

(56) References Cited

U.S. PATENT DOCUMENTS

2008/0294547 A1* 11/2008 Zigman .................. G06Q 10/00 705/38
2011/0035305 A1 2/2011 Imrey et al.

OTHER PUBLICATIONS

PCT/US2013/060180, Notification of Transmittal of the International Search Report and the Written Opinion of the International Searching Authority, or Declaration dated Dec. 27, 2013. (12 pages).
Office Action dated Apr. 17, 2013 from U.S. Appl. No. 13/626,785.
Office Action dated Jan. 17, 2014 from U.S. Appl. No. 13/626,785.
Office Action dated Aug. 1, 2014 from U.S. Appl. No. 13/626,785.

* cited by examiner

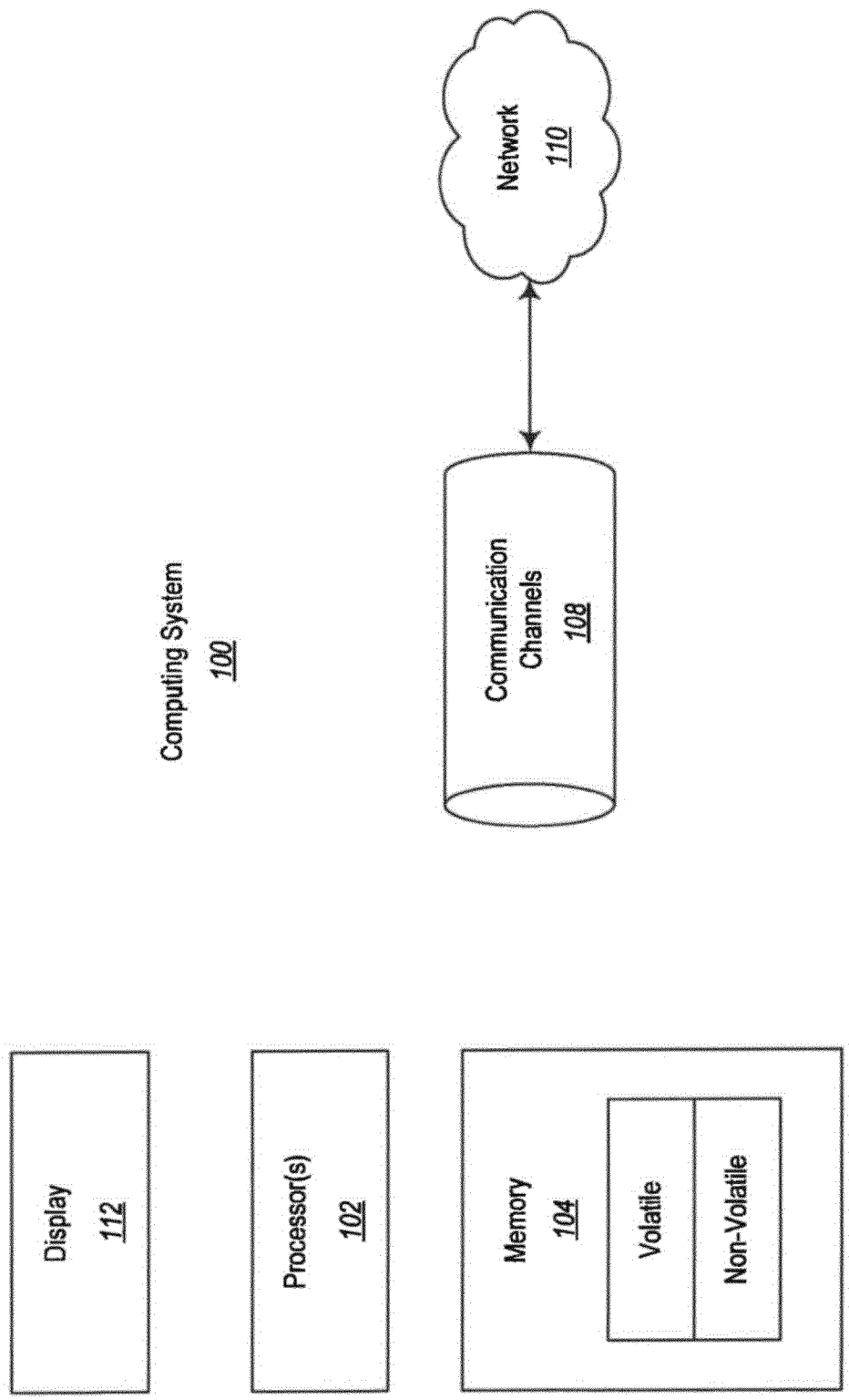

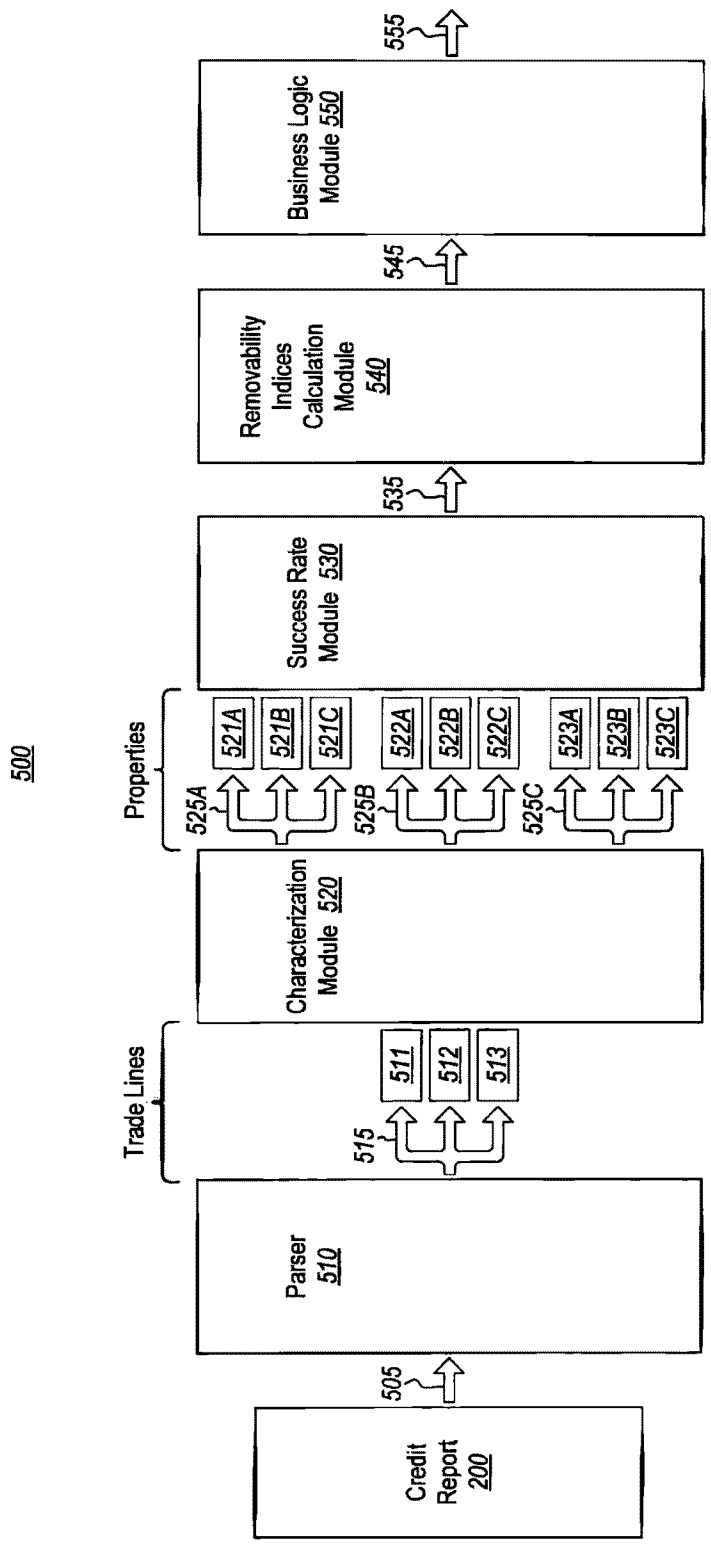

CREDIT REPAIR BY ANALYSIS OF TRADE LINE PROPERTIES

CROSS-REFERENCE TO RELATED APPLICATIONS

This patent application claims priority to and is a continuation of U.S. patent application Ser. No. 13/626,785 filed Sep. 25, 2012, which is incorporated herein by reference in its entirety.

BACKGROUND

A credit bureau (also called a Consumer Reporting Agency or CRA) is a company that collects information from various sources about individuals, and aggregates such information into a credit report. Currently, there are three major credit bureaus in the United States including EQUIFAX®, TRANSUNION® and EXPERIAN™.

The credit reports are relied upon by potential and current creditors of the individual, and other authorized entities, when determining whether to take appropriate action regarding the corresponding individual, such as whether to extend credit and under what terms, whether to lease a property, whether to extend an offer of employment, and so forth. Thus, negative items on an individual's credit report can adversely affect the opportunity available to that individual.

Often, a credit score is generated based on the credit report, which allows for a quick and rough approximation of the creditworthiness of the individual. One common credit score used in most applications for credit is called a FICO® SCORE®. FICO and FICO SCORE are registered trademarks of Fair Isaac Corporation. However, there are other scores less commonly used and generated by different algorithms using credit report items as input.

Credit repair services are offered by a number of organizations for the purpose of helping individuals improve their credit scores, thereby improving the opportunities available to the individual. For instance, the credit repair service may impact credit scoring by requesting that credit bureaus demonstrate that an individual's credit report trade lines have been reported fairly and accurately and can be fully substantiated by the associated information providers. For instance, by causing correspondence to be sent to the credit bureaus directly, in the form of an investigative inquiry or perhaps just a dispute regarding a questionable negative item, the credit bureaus may sometimes, but not always, remove that negative item from their credit reports when it is determined that the negative item is either based upon obviously false information, or cannot be readily and fully substantiated, or has not been fairly reported in accordance with applicable consumer protection statutes. Alternatively or in addition, by causing correspondence to be sent to a creditor, the creditor might likewise correspond with the credit bureaus causing the negative item to be removed from affected credit reports. As false, unsubstantiated, or unfairly reported negative items are removed or revised, the individual's credit scores tend to improve.

BRIEF SUMMARY

At least one embodiment described herein relates a computer-implemented method for taking appropriate action on a credit report for an individual using an analysis of properties of at least some of its constituent trade lines. Upon accessing the credit report, each of at least some of the trade lines in the credit report are processed by 1) identifying one or more properties of the trade line, 2) performing one or more removal success rate estimations for similar trade lines having at least one like property, and 3) calculating at least one removability index (e.g., an item removal difficulty index or an item removal speed index) for the trade line based on the removal success estimation(s). The calculated removability indices are then aggregated, and the course of action for the credit report as a whole is determined based on the removability indices.

For instance, as one example, the removability indices may be used in order to identify a sequence in which to intercede on the trade lines. Intercession might be accomplished by, for example, dispatching a letter to a creditor or a credit bureau regarding the trade line. The sequencing may also depend on the anticipated impact of having the trade line removed from the credit report.

The aggregated removability indices may be used to calculate a level of difficulty for improving the credit report, potentially leading to personalized communication with the client. If performed for multiple credit reports for an individual, and factoring in other data such as demographic data, and rate of improvement of credit score, a risk of attrition may be estimated for the individual.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 1 illustrates a computing system in which some embodiments described herein may be employed;

FIG. 2 abstractly illustrates a credit report data structure which includes multiple trade line data structures representing credit report trade lines;

FIG. 3 illustrates a credit reporting environment in which credit reports are generated, including multiple credit bureaus, multiple information providers (such as creditors), multiple individuals, and a credit repair system;

FIG. 4 illustrates a flowchart of a method for determining appropriate action on a credit report using properties of constituent trade lines;

FIG. 5 illustrates a computer architecture that may be represented in memory of a computing system, such as the computing system of FIG. 1, in order to perform the method of FIG. 4;

FIG. 6 illustrates a flowchart of a method for performing a first course of action including the sequencing of intercession for the trade lines;

FIG. 7 illustrates a flowchart of a method for performing a second course of action including determining a difficulty of the credit report; and FIG. 8 illustrates a flowchart of a method for performing a third course of action including determining an attrition risk for the client.

DETAILED DESCRIPTION

At least one embodiment described herein relates to a method, such as a computer-implemented method, for taking appropriate action on a credit report for an individual based on analysis of properties of at least some of the trade lines of the credit report. Upon accessing the credit report, each of at least some of the trade lines in the credit report are processed by 1) identifying one or more properties of the subject trade line, 2) performing one or more removal success rate estimations for similar trade lines having at least one like property compared to the subject trade line, and 3) calculating at least one removability index (e.g., an item removal difficulty index or an item removal speed index) for the subject trade line based on the removal success estimation(s). The calculated removability indices are then aggregated for multiple trade lines, and the course of action for the credit report as a whole is determined based on the removability indices.

For instance, as one example, the removability indices may be used in order to identify a sequence in which to intercede on the trade lines. Intercession might be accomplished by, for example, dispatching a letter to a creditor or a credit bureau regarding the trade line. The sequencing may also depend on the anticipated impact of having the trade line removed from the credit report.

The aggregated removability indices may be used to calculate a level of difficulty for improving the credit report. If performed for multiple credit reports for an individual, and factoring in other data such as demographic data, and rate of improvement of credit score, a risk of attrition may be estimated for the individual.

First, some introductory discussion regarding computing systems will be described with respect to FIG. 1. Then, a credit report and credit reporting environment will be described with respect to FIGS. 2 and 3. Then, embodiments of the credit repair system and its operation, in accordance with the principles described herein, will be described with respect to FIGS. 4 through 8.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110. If interaction with the user is beneficial, the computing system 100 may also include a display 112 and potentially other input/output devices.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Having described a computing system 100 that may implement features of the embodiments described herein, the principles of the novel computer-assisted credit repair techniques will be now be described.

FIG. 2 abstractly represents a credit report 200 that includes a number of trade lines 210 (of which trade lines 211, 212 and 213 are abstractly illustrated) relevant to the creditworthiness of an individual identified in the credit report with an individual identifier 201. The credit report 200 will be referred to herein as a "credit report for an individual" or a "credit report for the individual". The ellipses 214 represent that there may be any number of trade lines 210 in the credit report 200, and will depend on how much information has been provided by creditors and other information providers regarding the individual. A "trade line" is defined herein as any credit report entry. Typically, a trade line will correspond to a credit account attributed to the individual, and may include supplemental information such as, for example, the creditor identifier, the balance, and the status.

FIG. 3 illustrates a credit reporting environment 300 in which credit reports are generated. The environment 300 includes credit bureaus 310, information providers 320, individuals 330, and a credit repair system 301. The credit bureaus 310 include three credit bureaus 310A, 310B and 310C, although the ellipses 310D represent flexibility in the number of credit bureaus in the environment. In the United States, there are three primary credit bureaus including EQUIFAX®, TRANSUNION™ and EXPERIAN™. However, the principles described herein are not limited to the credit bureaus that operate in a particular region of the world, nor are they limited to currently existing credit bureaus.

The credit bureaus 310 each maintain a credit report for each of the individuals 330. For instance, individuals 330 are illustrated as including five individuals 330A through 330E. Accordingly, the credit bureau 310A maintains credit reports 311A through 311E corresponding to respective individuals 330A through 330E, the credit bureau 310B maintains credit reports 312A through 312E corresponding to respective individuals 330A through 330E, and the credit bureau 310C maintains credit reports 313A through 313E corresponding to respective individuals 330A through 330E. The ellipses 330F represent that there may be any number of individuals about whom the credit bureaus maintain a credit report. This flexibility is represented by ellipses 311F, 312F and 313F. Typically, a credit bureau will maintain a credit report regarding each of many millions of individuals. Each credit report is abstractly represented by an instance of the credit report 200 illustrated in FIG. 2.

The environment 200 also includes information providers 320. There are four information providers 320A through 320D illustrated, although the ellipses 320E represent flexibility in this number. Furthermore, for any given individual, the information providers may be different. Information providers are most typically current or prospective creditors of the individual about whom they are providing information. However, other information providers (such as courts or government agencies) might provide information for the credit report.

Information providers might also consume credit reports corresponding to an individual to whom they may extend credit, lease a property, or extend offers of employment. The potential bi-directional nature of such communication is represented by bi-directional arrow 341. The direct or indirect interaction between the individuals 330 and the information providers 320 that results in the information providers 320 obtaining reportable information regarding the individuals 330 is represented by bi-directional arrow 342. Accordingly, through interaction 341 and 342, credit reports may be generated by credit bureaus 310.

The operation of the credit repair system 301 will now be described with respect to FIGS. 4 through 8. FIG. 4 illustrates a flowchart of a method 400 for determining appropriate action on a credit report using properties of constituent trade lines. In some embodiments, the method 400 may be performed by, for example, the computing system 100 of FIG. 1 implemented in the credit repair system 301 of FIG. 3, although not required.

The method 400 begins by accessing a credit report for an individual (act 401). For instance, referring to FIG. 3, the credit repair system 301 accesses a credit report (e.g., credit report 311A) associated with an individual (e.g., individual 330A). This act might involve accessing the credit report for the individual from multiple credit bureaus. For instance, the credit repair system 301 might access all three credit reports 311A, 312A and 313A from respective credit bureaus associated with a single individual 330A.

The accessing of the credit report may be performed by requesting the corresponding credit report from the credit bureau. In response, as represented by arrow 351 in FIG. 3, the credit bureau responds by dispatching the credit report to the credit repair system 301 as represented by arrow 351 in FIG. 3. For instance, the credit report might be a physical or electronic copy of the credit report. In some embodiments, the credit bureau and the credit repair system may cooperatively interact to exchange data representative of the credit report in which the data is structured accordance with some negotiated schema. For instance, the credit bureau may provide an eXtensible Markup Language (XML) file representing the credit report to the credit repair system 301. As a side note, communications involved in establishing the credit report are represented by solid-lined arrows (e.g., arrows 341 and 342) in FIG. 3. However, communications involved in repairing credit are represented by dotted-lined arrows (e.g., arrows 351, 352 and 353) in FIG. 3.

In some cases, the credit bureau and the credit repair system 301 may not have such an integrated interface. Furthermore, in some cases the credit bureau may not provide even a physical copy of the credit report to the credit repair system 301. In that case, the individual themselves may request the credit report from the credit bureau. Alternatively, the individual may provide authentication credentials to the credit repair system 301, allowing the credit repair system 301 to access the credit report on the individual's behalf online. Both of these cases are represented by the arrow 352 in FIG. 3.

FIG. 5 illustrates a computer architecture 500 that may be represented in memory of a computing system (such as in the memory 104 of the computing system 100 of FIG. 1), in order to perform the method 400 of FIG. 4. For instance, the computer architecture 500 may be present within a computing system in the credit repair service 301 of FIG. 3. Referring FIG. 5, the credit report 200 is received by the computer architecture as represented by arrow 505.

The various modules 510, 520, 530, 540 and 550 of FIG. 5 may be created in memory by having the computing system accesses computer-executable instructions from memory, and having the computing system executing those computer-executable instructions using one or more digital processors thereby causing the computer architecture 500 of FIG. 5 to be generated and to be operated as described herein. In this description, accessing items "from memory" and providing "to memory" is not to be interpreted as necessitating that "memory" be a single device or type of memory. The memory may be multiple devices, and multiple different types of memory at perhaps different levels of the memory hierarchy all the way from non-volatile storage (locally or remotely located) all the way up to processor registers. Thus, the term "memory" should be interpreted broadly in the description and in the claims.

Referring to FIG. 4, the contents of dashed-lined box 410 are then performed for each of at least some of the trade lines within the one or more credit reports accessed in act 401. If the credit report is provided in physical form, then a human being might type the trade lines from the credit report into a computing system. Referring to FIG. 5, if the credit report is in electronic format, the parser component may parse the credit report (e.g., credit report 200) to access multiple trade lines from the credit report 200. The parser may further generate corresponding trade line data structures 511 through 513 corresponding to trade lines 211 through 213 of the credit report 200. The number of trade lines extracted by the parser 510 is, however, flexible. The principles described herein do not require that all trade lines be parsed, though it is helpful to parse more.

If the credit report is an image file, the parser 510 may perform text recognition. If the credit report is in text format, the parser 510 may scan the text to find the boundaries of the trade lines. If the credit report is in a predetermined schema (e.g., in XML format), then the parser 510 may perform XML parsing.

The trade line data structures are "passed" from the parser to the characterization module 520 as represented by arrow 515. In this description and in the claims, when a source module of a computer architecture "passes" a data structure to a target module, this means that the source module causes the target module to be able to access the data structure. For instance, one way to do this is to simply provide the data structure to memory at a location that may then be accessed by the target module. Such passing is represented by rightward-facing arrows in FIG. 5.

Referring back to FIG. 4, for each of at least some of the parsed trade lines, the trade line is then accessed (act 411), and a set of one or more properties of the trade line are identified (act 412). Examples of properties of trade lines include 1) whether the trade line is an installment (for an installment loan) or revolving (e.g., a revolving line of credit), 2) the severity type of the trade line, 3) a balance range of the trade line, 4) a utilization ratio range of the trade line and 5), a creditor identity for the trade line.

Examples of severity level values include 30 day, 60 day, 90 day, 120+ day, Charge-off, Collection, Incl in BK, Bankrupcy, Settlement, Repossession, Lien, Judgment, Garnishment, Foreclosure. Examples of balance range values include 0 to 250 dollars, 251 to 500 dollars, 501 to 750 dollars, 751 to 1000 dollars, 1001 to 2500 dollars, 2501 to 5000 dollars, and 5001 dollars and above. Examples of utilization ratio range values include 0 to 10 percent, 10.1 to 30 percent, 30.1 to 50 percent, 50.1 to 70 percent, 70.1 to 80 percent, 80.1 to 90 percent, and 90.1 to 100 percent. Examples of creditor identifier values are names of specific banks, utility companies, collection companies, retail stores, credit card providers, and so forth.

If the method 400 is performed by the computing system 100 in the credit repair system 301, a trade line characterization module 520 identifies a set of one or more properties of the subject trade line (act 412). For instance, the trade line characterization module 520 accesses the digital representation of the trade line 511, identifies a set of one of more properties of the trade line using the accessed trade line digital representation 511, and provides a digital representation 521A, 521B and 521C of the set of one or more properties into memory as represented by arrow 525A. Furthermore, the trade line characterization module 520 accesses the digital representation of the trade line 512, identifies a set of one of more properties of the trade line using the accessed trade line digital representation 512, and provides a digital representation 522A, 522B and 522C of the set of one or more properties into memory as represented by arrow 525B. Also, the trade line characterization module 520 accesses the digital representation of the trade line 513, identifies a set of one of more properties of the trade line using the accessed trade line digital representation 513, and provides a digital representation 523A, 523B and 523C of the set of one or more properties into memory as represented by arrow 525C.

Of course, while in this example each trade line is identified as having three properties, the trade line characterization module 520 may identify any number of properties from the corresponding trade line. For instance, the trade line characterization module 520 might identify 1) the severity level, 2) installment versus revolving, 3) balance range, and 4) creditor name.

Referring back to FIG. 4, one or more removal success rate estimations are then made for like trade likes that have all or a subset of the one or more properties of the subject trade line. For instance, this estimation may be made based on historical success rates for trade lines having one of the properties of the subject trade line. Suppose, for example, that a particular trade line (also referred to as the "subject trade line") being evaluated has the following four property values:

1) Severity Type: Collection
2) Installment versus Revolving: Revolving
3) Balance Level: 501 to 750 dollars
4) Creditor: Fiction Bank, Inc.

In this case, the act 413 might involve calculating as few as one, and as many as four removal success rate estimations. The case of calculating four removal success rate estimations will first be described.

In the case of four removal success rate estimations, to calculate a first remove success rate estimation, the historical performance of the trade lines that also have the first property value "Collection" of the first property "Severity Type" is determined. For instance, suppose that taking all the trade lines having this Severity Type of value Collections, there has been a success rate (referred to as SRA in equation 1 for Success Rate Actual) in response to a single intercession (e.g., the sending of a targeted letter to the creditor or credit agency) of 21%. This value may be compared to the average success rate (referred to as SRE in equation 1 for Success Rate Expected) for a single intercession for all trade lines of 20%. Thus, if a trade line is a Collection trade line, there is a slightly better chance than random of having an intercession be successful. In one embodiment, a removal success rate estimation might be defined by the following Equation 1, where RSRE is the removal success rate estimation.

$$RSRE = N*((SRE - SRA)/SRE) \quad (1)$$

Suppose that N is 1000 (but may be arbitrary), this would result in the first RSRE value (corresponding to "Collection" severity type) being $1000*((0.20-0.21)/0.2)$, which reduces to $1000*(-0.01/0.2)$, which equals −50. Thus $RSRE_1$ equals −50.

This same Equation 1 may be used again for the second removal success rate estimation ($RSRE_2$), which is determined by evaluating historical removal success rate estimate for all trade lines in which the installment versus revolving value matches that of the subject trade line being evaluated. In this case, that property value is Revolving. For instance, suppose that taking all the trade lines of a Revolving type, there has been a single intercession success rate of 12%. This value may be compared to the average single intercession success rate for all trade lines of 20%. Thus, if a trade line is a Revolving type, there is a much less chance than random of having an intercession be successful. Applying Equation 1 for $RSRE_2$ should then yield $1000*(0.2-0.12/0.2)$, which equals 400. Thus, we see that positive values for RSRE result in an estimation that these types of trade lines are less successful than average after a single intercession, whereas negative values for RSRE result in an estimation that these types of trade lines are more successful than average after a single intercession.

Equation 1 may be used again for the third removal success rate estimation ($RSRE_3$), which is determined by evaluating historical removal success rates for all trade lines in which the balance level value matches that of the trade line being evaluated (in this case, 501 to 750 dollars). For instance, suppose that taking all the trade lines of a balance level of 501 to 750 dollars, there has been a single intercession success rate of 25%. This value may be compared to the average single intercession success rate for all trade lines of 20%. Thus, if a trade line is a Revolving type, there is a greater chance than random of having an intercession be successful. Applying Equation 1 for $RSRE_3$ should then yield $1000*(0.2-0.25/0.2)$, which equals −250.

Equation 1 may finally be used for the last removal success rate estimation ($RSRE_4$), which is determined by evaluating historical removal success rates for all trade lines in which the creditor identifier value matches that of the trade line being evaluated (in this case, Fictional Bank, Inc.). Needless to say, "Fictional Bank, Inc." is not intended to refer to any specific bank, but is just a fabricated name used simply for the purpose of this description. For instance, suppose that taking all the trade lines for the Fictional Bank, Inc., there has been a single intercession success rate of 20%. This value may be compared to the average single intercession success rate for all trade lines of 20%. Thus, if a trade line corresponds to Fictional Bank, Inc., there is just as much of a chance of a successful intercession as random. Applying Equation 1 for $RSRE_4$ should then yield $1000*(0.2-0.20/0.2)$, which equals zero.

Thus, in this case, where a removal success rate estimate ($RSRE_1$, $RSRE_2$, $RSRE_3$ and $RSRE_4$) was calculated for each of the four properties of the subject trade line, there are likewise four removal success rate estimates. In another embodiment, there is but one removal success rate estimate. In yet other embodiments, there is some number of estimates between one and the number of properties in the subject property. This description will return to these alternative embodiments further below. But for now, this description will progress further through FIG. 4.

Referring back to FIG. 4, the credit report system then calculates at least one removability index for the trade line based on the at least one removal success estimation (act 414). For instance, in the case of there being one removal success rate estimation RSRE for every property of the trade line, the following values were derived in the example:

$RSRE_1 = -50$;
$RSRE_2 = 400$;
$RSRE_3 = -250$; and
$RSRE_4 = 0$.

The calculation of the removability index might be obtained by using these four factors. For instance, the four RSRE values might be simply summed, which would lead to a removability index of positive 100 (e.g., −50+400−250+0). Of course, other more complex functions might also be used. The removability index might be referred to as an "item difficulty valence" or "IDV" herein.

In some embodiments, as an alternative or in addition to calculating the IDV, another removability index may be calculated. For instance, such might be referred to as an "item speed valence" or "ISV". In this case, different RSRE values might be calculated for each of the four properties based on an average speed in which like trade lines are resolved, when they are resolved. A similar calculation on these other RSRE values may be used to determine in ISV for the trade line. These removability indices are, however, just examples. Any removability index for a trade line that provides some clue as to the likelihood and/or speed in being able to remove the trade line from the credit report will suffice consistent with the broader principles described herein.

In this example, four RSRE values were used to calculate a single IDV value for a trade line. In an alternative embodiment, a single RSRE value might have been calculated. For instance, consider the same example in which there is a trade line for a revolving line of credit from Fiction Bank, Inc. that was in collection, and having a balance in the range of 501 to 750 dollars. If the historical data was refined enough, there might be enough of a sample size to be able to determine historical success rates for exactly those types of trade lines that have all four properties being the same. For instance, if the overall success rate was 18.5 percent for exactly that type of trade line, Equation 1 might be applied to determine a single RSRE value ($RSRE_{1234}$) of $1000*((0.2-0.185)/0.2)$, which equals 75. In this case, the calculation of the IDV value (in act 414) might be trivial, and just made equal to the RSRE value. An ISV value may be calculated in a similar way if there is sufficient historical speed data regarding trade lines of that exact type.

Accordingly, two examples have been described, a first in which four RSRE values were determined ($RSRE_1$, $RSRE_2$, $RSRE_3$ and $RSRE_4$) and the removability index calculated based on those four factors, and a second in which a single RSRE value was determined ($RSRE_{1234}$) and the removability index calculated based on that factor. However, in hybrid approaches, there might be only two RSRE values calculated, one based on one property (e.g., $RSRE_1$) and one based on a combination of the other properties (e.g., $RSRE_{234}$). All other permutations are contemplated to be within the scope of the principles described herein. Also, all manner of calculation of the RSRE values are also contemplated to be within the scope of the principles described herein.

In any case, if the calculation of the removability index is performed by a computing system 100 in the context of the credit repair system 301 of FIG. 3, the calculation may be performed by, for example, the removability indices calculation module 540, which receives the removal success estimations as represented by arrow 535. For instance, the removability indices calculation module 540 may access the removal success estimations from memory, calculate the removability indices and digitally represent such as a removability index data structure, and provide the digital representation of the removability indices into memory as represented by arrow 545.

The contents of box 410 may be performed for multiple trade lines as previously mentioned. Accordingly, one or more removability indices for each of multiple trade lines may be aggregated (act 402). Then, a course of action may then be determined based on the calculated removability indices (act 403). For instance, if performed by a computer system 100 in the credit repair system 301, a business logic module 550 accesses the digital representations of the removability indices from memory as represented by arrow 545, calculates an appropriate action based on this input, which the appropriate action represented by arrow 555.

FIG. 6 illustrates a flowchart of a method 600 for accomplishing a first course of action. In this embodiment, the course of action is that a sequence of intercession of the trade lines is embarked upon. An example of an intercession with respect to trade line is the dispatching of a targeted letter regarding the trade line to the corresponding creditor or to the credit bureau. This dispatching is represented by the arrow 353 in FIG. 3. First, the method 600 includes sequencing initiation of intercession associated with trade lines corresponding to the calculated removability indices at least in part based on the calculated removability indices (act 601). Client preferences may be used to perform this sequencing, in addition to consulting the calculated removability indices. Easier intercessions that result in greater impact on credit score might, for example, be targeted for earlier action to that the client can experience more rapid early improvement in the credit score. Such may help the client realize the effectiveness of the credit repair service 301.

Once the sequence is generated, intercession may be initiated according to the sequence (act 602). For instance, when it is time to initiate intercession associated with a trade line, a physical letter relating to the trade line is mailed to a creditor associated with the trade line, or a credit bureau associated with the credit report. However, the principles described herein are not limited to any particular type of intercession mechanism. Other communication mechanisms such as in person, telephonic, or electronic may also be used to intercede for the client for a given trade line.

In the embodiments described above, the statistics associated with historical success rates were evaluated based on actual empirical success rates based on trade lines having similar properties to the subject trade line. However, the intercession methodology was left generic in this analysis. However, the statistical analysis may be further refined by evaluating historical success rates associated with different intercession methodology. For instance, one intercession methodology might be to send a letter of a first type to a creditor, whereas another methodology might be to send a letter of a second type to the creditor, and yet a third methodology might be to send a letter of a third type to the credit bureau. Refined estimates of success may thus be determined based not only on the historical success rates of like trade lines, but alternatively or addition, may be based upon different intercession methodologies. Thus, in addition to choosing a sequencing of intercession, the intercession methodology for each trade line may also be determined.

FIG. 7 illustrates a flowchart of a method 700 corresponding to a second course of action. In this second course of action, a relative difficulty in improving the credit report is calculated based on the aggregated removability indices (act 701). The method 700 generates an index of difficulty for the credit report (702). For instance, this difficulty index may be proportional to the sum of the removability indices of the various trade lines in the credit report. The method 700 then involves performing additional client communications based on the calculated difficulty in improving the credit report (act 703). For instance, telephonic, electronic or postal communications may be dispatched to the client, particularly if the credit report is anticipated to be a difficult case for credit repair.

FIG. 8 illustrates a flowchart of a method 800 corresponding to a third course of action associated with estimating a risk of attrition of a client requesting improvement of a credit report of the individual. In this method 800, a calculated difficulty in improving the credit report is accessed (act 801). For instance, the difficulty index calculated in act 702 of method 700 may be accessed. As the credit repair service 301 may access various iterations of the credit report, the difficulty index associated with prior iterations of the credit report may also be accessed (also act 801). Also, demographics of the client may be accessed (act 802), in addition to a results rate in improving the credit report of the individual (act 803). Based on these input factors, a risk of attribution associated with the client may be calculated (act 804). Such calculation may, for example, be based on historical data regarding attrition of prior clients.

Accordingly, the principles described herein provide an advanced mechanism for evaluating credit repair techniques. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method implemented by a computing system, comprising:

accessing, by a computing system, computer-executable instructions, and executing those computer-executable instructions using one or more digital processors thereby causing the following to be performed for each of at least some of a plurality of trade lines in a credit report:

the computing system accessing the credit report having the plurality of trade lines;

the computing system determining whether the credit report is in a text format or an XML format;

the computing system parsing the credit report to identify one or more trade lines within the credit report by selectively (1) performing text recognition if it is determined the credit report is in a text format and by at least identifying boundaries of the one or more trade lines within the credit report, and (2) performing XML parsing if it is determined the credit report is in an XML format;

the computing system generating a digital representation of one or more trade lines identified from the parsing;

the computing system accessing the digital representation of the one or more trade lines, identifying a set of at least four separate properties for each of the one or more trade lines using the accessed digital representation of the one or more trade lines, and providing a digital representation of the set of the at least four separate properties, the at least four separate properties including (i) a trade line type, (ii) a trade line utilization (iii) a trade line creditor identifier and (iv) a trade line severity that has a corresponding rule defining a set of predetermined numeric value ranges usable to characterize and assign a severity level for the trade line severity property;

the computing system referencing the digital representation of the set of properties to perform a removal success rate estimation for each of the at least four separate properties, such that at least four separate removal success rate estimations are generated for the corresponding at least four separate properties, respectively;

the computing system formulating a digital representation of each of the at least four removal success rate estimations, and providing the digital representation of each of the at least four removal success rate estimations to a removability index calculation module;

the computing system referencing the digital representation of the at least four removal success rate estimations to calculate a single removability index value that is based on all of the at least four separate removal success rate estimations for a corresponding trade line and that indicates at least an ability to remove the corresponding trade line from the credit report;

the computing system formulating a digital representation of the calculated single removability index for the corresponding trade line;

the computing system initiating an automated intercession associated with the one or more trade lines based on the calculated single removability index, wherein initiating the automated intercession includes the computing system sequencing a plurality of different intercessions into a sequence of intercessions to be performed based on relative effectiveness of the plurality of different intercessions for removing the corresponding trade line, and selecting a particular intercession in the sequence of intercessions that has a higher effectiveness for removing the corresponding trade line than at least one other intercession in the sequence of intercessions, such that the automatically performing the automated intercession includes automatically performing the particular intercession in the sequence of intercessions before the at least one other intercession, the automated intercession including generation of a plurality of letters to be dispatched to different entities, including a first letter of a first type to a first entity comprising a creditor and a second letter of a different type to a second entity comprising a credit bureau; and the computing system automatically performing the automated intercession by at least generating the plurality of letters of the different types for dispatch to the different entities based at least on the calculated removability index.

2. The method in accordance with claim 1, wherein the severity type of the trade line is a foreclosure type.

3. The method in accordance with claim 1, wherein the trade line type specifies whether the trade line is an installment type or a revolving type.

4. The method in accordance with claim 1, wherein the trade line utilization property comprises a balance range.

5. The method in accordance with claim 1, wherein the creditor identity is selected from a group consisting of: a utility company, a collection company, a retail store, a specific bank name, and a credit card provider.

6. The method in accordance with claim 1, wherein at least one of the removal success rate estimations having a digital representation formed by the removal success rate module comprises:

a historical success rate for trade lines for trade lines having a first property of the set of one or more properties of the trade line.

7. The method in accordance with claim 6, wherein historical success rate is a first historical success rate, the at least one of the removal success rate estimations having the digital representation formed by the removal success rate module further comprising:

a second historical success rate for trade lines having a second property of the set of one or more properties of the trade line.

8. The method in accordance with claim 6, wherein historical success rate is a first historical success rate, the at least one of the removal success rate estimations having the digital representation formed by the removal success rate module further comprising:

a second historical success rate for trade lines having at least a second property and a third property of the set of one or more properties of the trade line.

9. The method in accordance with claim 1, wherein the at least one removal success rate comprises a single historical success rate for trade lines having all of the set of one or more properties of the trade line.

10. The method in accordance with claim 1, wherein the determined course of action includes calculating a relative difficulty in improving the credit report based on the aggregated plurality of removability indices.

11. The method in accordance with claim 10, wherein the determined course of action is also estimating a risk of attrition of a client requesting improvement of a credit report of the individual, the estimated risk of attrition at least based on the calculated relative difficulty in improving the credit report, as well as calculated relative difficulty in improving previous instances of the credit report of the individual.

12. The method in accordance with claim 1, wherein the determined course of action is estimating a risk of attrition of a client requesting improvement of a credit report of the individual.

13. The method in accordance with claim 12, wherein estimating the risk of attrition of the client is further based on demographic client demographics.

14. The method in accordance with claim 12, wherein estimating the risk of attrition of the client is further based on a results rate in improving the credit report.

15. The method in accordance with claim 1, wherein the set of one or more properties of at least one of the trade lines having a digital representation accessed by the trade line characterization module comprises a utilization ratio range of the trade line.

16. A computing system comprising:
one or more processors; and
one or more hardware storage device having stored computer-executable instructions which are executable by the one or more processors for causing the computing system to implement a method that includes: the computing system accessing the credit report having the plurality of trade lines;
the computing system determining whether the credit report is in a text format or an XML format;
the computing system parsing the credit report to identify one or more trade lines within the credit report by selectively (1) performing text recognition if it is determined the credit report is in a text format and by at least identifying boundaries of the one or more trade lines within the credit report, and (2) performing XML parsing if it is determined the credit report is in an XML format;
the computing system generating a digital representation of one or more trade lines identified from the parsing;
the computing system accessing the digital representation of the one or more trade lines, identifying a set of at least four separate properties for each of the one or more trade lines using the accessed digital representation of the one or more trade lines, and providing a digital representation of the set of the at least four separate properties, the at least four separate properties including (i) a trade line type, (ii) a trade line utilization (iii) a trade line creditor identifier and (iv) a trade line severity that has a corresponding rule defining a set of predetermined numeric value ranges usable to characterize and assign a severity level for the trade line severity property;
the computing system referencing the digital representation of the set of properties to perform a removal success rate estimation for each of the at least four separate properties, such that at least four separate removal success rate estimations are generated for the corresponding at least four separate properties, respectively;
the computing system formulating a digital representation of each of the at least four removal success rate estimations, and providing the digital representation of each of the at least four removal success rate estimations to a removability index calculation module;
the computing system referencing the digital representation of the at least four removal success rate estimations to calculate a single removability index value that is based on all of the at least four separate removal success rate estimations for a corresponding trade line and that indicates at least an ability to remove the corresponding trade line from the credit report;
the computing system formulating a digital representation of the calculated single removability index for the corresponding trade line;
the computing system initiating an automated intercession associated with the one or more trade lines based on the calculated single removability index, wherein initiating the automated intercession includes the computing system sequencing a plurality of different intercessions into a sequence of intercessions to be performed based on relative effectiveness of the plurality of different intercessions for removing the corresponding trade line, and selecting a particular intercession in the sequence of intercessions that has a higher effectiveness for removing the corresponding trade line than at least one other intercession in the sequence of intercessions, such that the automatically performing the automated intercession includes automatically performing the particular intercession in the sequence of intercessions before the at least one other intercession, the automated intercession including generation of a plurality of letters to be dispatched to different entities, including a first letter of a first type to a first entity comprising a creditor and a second letter of a different type to a second entity comprising a credit bureau; and
the computing system automatically performing the automated intercession by at least generating the plurality of letters of the different types for dispatch to the different entities based at least on the calculated removability index.

17. One or more hardware storage device having stored computer-executable instructions which are executable by the one or more processors of a computing system for causing the computing system to implement a method that includes:
the computing system accessing the credit report having the plurality of trade lines;
the computing system determining whether the credit report is in a text format or an XML format;
the computing system parsing the credit report to identify one or more trade lines within the credit report by selectively (1) performing text recognition if it is determined the credit report is in a text format and by at least identifying boundaries of the one or more trade lines within the credit report, and (2) performing XML parsing if it is determined the credit report is in an XML format;
the computing system generating a digital representation of one or more trade lines identified from the parsing;
the computing system accessing the digital representation of the one or more trade lines, identifying a set of at least four separate properties for each of the one or more trade lines using the accessed digital representation of the one or more trade lines, and providing a digital representation of the set of the at least four separate properties, the at least four separate properties including (i) a trade line type, (ii) a trade line utilization (iii) a trade line creditor identifier and (iv) a trade line severity that has a corresponding rule defining a set of predetermined numeric value ranges usable to characterize and assign a severity level for the trade line severity property;
the computing system referencing the digital representation of the set of properties to perform a removal success rate estimation for each of the at least four separate properties, such that at least four separate removal success rate estimations are generated for the corresponding at least four separate properties, respectively;
the computing system formulating a digital representation of each of the at least four removal success rate estimations, and providing the digital representation of each of the at least four removal success rate estimations to a removability index calculation module;
the computing system referencing the digital representation of the at least four removal success rate estimations to calculate a single removability index value that is based on all of the at least four separate removal success rate estimations for a corresponding trade line and that indicates at least an ability to remove the corresponding trade line from the credit report;

the computing system formulating a digital representation of the calculated single removability index for the corresponding trade line;

the computing system initiating an automated intercession associated with the one or more trade lines based on the calculated single removability index, wherein initiating the automated intercession includes the computing system sequencing a plurality of different intercessions into a sequence of intercessions to be performed based on relative effectiveness of the plurality of different intercessions for removing the corresponding trade line, and selecting a particular intercession in the sequence of intercessions that has a higher effectiveness for removing the corresponding trade line than at least one other intercession in the sequence of intercessions, such that the automatically performing the automated intercession includes automatically performing the particular intercession in the sequence of intercessions before the at least one other intercession, the automated intercession including generation of a plurality of letters to be dispatched to different entities, including a first letter of a first type to a first entity comprising a creditor and a second letter of a different type to a second entity comprising a credit bureau; and the computing system automatically performing the automated intercession by at least generating the plurality of letters of the different types for dispatch to the different entities based at least on the calculated removability index.

\* \* \* \* \*